United States Patent [19] [11] 4,234,549
Stanley et al. [45] Nov. 18, 1980

[54] NOVEL COMBUSTION PROCESS FOR AN ORGANIC SUBSTRATE

[75] Inventors: Priscilla B. Stanley, Pleasantville; James S. Ritscher, Ossining, both of N.Y.

[73] Assignee: Union Carbide Corporation, New York, N.Y.

[21] Appl. No.: 53,194

[22] Filed: Jun. 29, 1979

[51] Int. Cl.³ .............................................. B01D 53/34
[52] U.S. Cl. ................................... 423/245; 423/210; 252/455 Z
[58] Field of Search ............. 423/210 S, 245 S, 213.2, 423/213.5; 252/446, 445 Z

[56] References Cited

U.S. PATENT DOCUMENTS

| 3,591,488 | 7/1971 | Eberly, Jr. et al. | 252/455 Z |
| 3,658,724 | 4/1972 | Stiles | 252/446 |
| 4,025,605 | 5/1977 | Dalton, Jr. et al. | 423/245 S |

OTHER PUBLICATIONS

Nwankwo et al., "Catalytic Oxidation of Vapors Adsorbed on Activated Carbon," Environmental Science & Technology, vol. 9, No. 9, Sep. 1975, pp. 846-848.

Primary Examiner—Earl C. Thomas
Attorney, Agent, or Firm—Gary L. Warner

[57] ABSTRACT

A process for the catalytic combustion of an organic substrate which comprises intimately contacting the organic substrate, comprised of one or more components, with an adsorption/combustion catalyst bed comprised of a metal-containing zeolite wherein the metal is at least one of platinum palladium, copper nickel, chromium and manganese. After sufficient organic substrate is adsorbed by the catalyst bed the substrate is combusted by an adiabatic temperature rise of the catalyst bed. The process is particularly well-suited for the removal of an organic substrate from a dilute stream.

19 Claims, 9 Drawing Figures

NOVEL COMBUSTION PROCESS FOR AN ORGANIC SUBSTRATE

FIELD OF THE INVENTION

The invention relates in general to a particular method for the combustion of an organic substrate, which method is especially well-suited for the separation of organic components from dilute streams and the conversion thereof to innocuous gaseous derivatives.

BACKGROUND OF THE INVENTION

One of the more difficult pollution control problems is the combustion of an organic substrate comprised of one or more organic compounds and, in particular, the treatment of an organic substrate contained in a dilute gaseous stream. Such streams are, for example, automotive spray booth emissions, vent streams from industrial processes, storage bin vent emissions and vent streams from coil and can coating processes. If the stream is exceptionally dilute (such as on the order of ten parts per million or less by volume), the organic substrate can be removed, ordinarily, by passage of the stream through a packed bed of carbon adsorbent. If, however, the organic substrate in the stream to be treated is prone to polymerize, the carbon bed will not be regenerable, i.e. reusable, and must frequently be replaced at both considerable cost and inconvenience. If the stream is moderately dilute (such as on the order of ten to one thousand parts per million by volume), adsorption on carbon is impractical. Under such circumstances, the carbon bed becomes saturated so quickly that it must be regenerated at impractically and even impossibly frequent intervals. Polymerizable substrates compound the problem by making regeneration that much more difficult.

The alternative to adsorption is incineration. In accordance with this method, instead of simply removing the organic substrate, it is converted by oxidation (i.e. combustion) in an incinerator to essentially carbon dioxide and water. Such end products, in the low total concentration found in the effluent, are innocuous, and hence pollution is abated. There are two types of incineration, commonly referred to as "Steady State" combustion, which may be employed, namely thermal and catalytic. Both are employed for pollution control, i.e. removal of an organic substrate from a dilute stream, with various designs and modifications being available. Both of these methods rely on elevated temperatures to cause the oxidative degradation of the organic substrate.

In thermal incineration the dilute stream (containing at least a few percent of a stoichiometric excess of oxygen for the combustion of the substrate to essentially carbon dioxide and water) is heated to a high temperature, of the order of 700° C., for a period of about one second. Treatment in this fashion generally can reduce the content of organic substrate in the stream by some 80 to 90 percent. The higher the temperature to which the dilute stream is heated, the greater the diminution of the organic substrate which can be achieved. Alternatively, in theory, the residence time may be increased to achieve greater combustion, but this is generally found to be impractical. By going to exceedingly high temperatures of combustion (such as on the order of 1000° C.) 99.9 percent or greater combustion can usually be achieved.

In practice, abatement of pollution by thermal incineration of the organic substrate has several disadvantages, especially when the substrate is found in a dilute gaseous stream. For example, it is usually necessary to use an auxiliary fuel, such as methane, propane and other combustible hydrocarbons. Indeed, safety requirements may preclude thermally incinerating a stream which is so rich in the organic substrate as to sustain combustion without an auxiliary fuel. In the case of a dilute or moderately dilute stream, nearly all the heat necessary to reach the combustion temperature (on the order of 600° C. to 900° C.) comes from the auxiliary fuel. If the heat from incineration can be recovered and is of value, the cost of the auxiliary fuel is partly offset by the value of the recovered heat. However, the recovery of the heat from the incineration requires a large capital investment, and invariably the amount of heat recovered is less than that initially provided by the auxiliary fuel. On the other hand, if there is no value to the recovered heat, the auxiliary fuel is essentially wasted, serving only to heat the stream to the temperature at which combustion of the organic substrate occurs. Furthermore, where greater than a 90 percent reduction in the organic content of the stream is desired, i.e. over 90% combustion of the organic substrate, the thermal conditions become exceedingly severe, and more expensive materials of construction are required and more frequent failure of the equipment occurs.

The aforementioned catalytic incineration method uses a combustion catalyst to facilitate the combustion reaction. With a catalyst present, combustion generally proceeds at only moderately high temperatures (such as on the order of 300°–400° C.) with a residence time on the order of 0.1 second. The extent of conversion is again 80 to 90 percent, with a higher reduction in the organic level being attainable by operating at higher temperatures or by increasing the residence time of the organic substrate with the combustion catalyst.

Catalytic incineration also has several disadvantages. Although the temperature to which the dilute stream must be raised is less than in thermal incineration, the use of an auxiliary fuel is still required unless the concentration of the organic substrate is moderately high (such as on the order of 5000 parts per million by volume). As in thermal incineration, if the heat produced is not recovered, the value of the auxiliary fuel is lost. Improved performance, i.e. greater reduction in the amount of organic substrate, is again achieved by raising the operating temperature but this invariably requires the use of a large quantity of auxiliary fuel. Furthermore, the catalysts used in catalytic incineration tend to "age" and thus performance deteriorates with time. This deterioration is accelerated at high combustion temperatures. In addition, the combustion catalyst may be poisoned by the inadvertent catalytic incineration of certain materials, e.g. sulfur-containing compounds, resulting in catalyst deactivation. If the catalyst is contacted below the temperature of combustion with an organic substrate which tends to polymerize at a temperature below its temperature of combustion, there can be formed a layer of coke, or a polymer film can be deposited on the catalyst surface. This could inhibit further combustion of the substrate unless very high temperatures, sufficient to remove the deposit, are employed. It follows that deactivation can necessitate catalyst replacement, a costly and time consuming procedure.

From the foregoing it is evident that treatment of an organic substrate in a dilute stream presents a difficult pollution abatement problem. Heretofore, such treatment required a large capital investment (in adsorption beds or incineration units) and usually resulted in high operating costs (auxiliary fuel, combustion catalyst replacement, or carbon bed replacement).

The various problems outlined above have been recognized by workers in the field for many years. One possible solution to these various problems is to combine adsorption and combustion. In this method an adsorbent is used to concentrate the organic substrate and a catalyst is used to combust the adsorbed organic substrate after it is desorbed from the adsorbent. In this fashion, the use of auxiliary fuel is restricted to that period during which desorption/combustion occurs, and the use of the combustion catalyst minimizes the ultimate temperature required to achieve combustion.

The method of combining adsorption and combustion is disclosed in U.S. Pat. No. 3,658,724, to Stiles, although the disclosed adsorbent/oxidation catalyst suffers from several inherent disadvantages. As disclosed in Stiles, the porous adsorbent shape of the catalyst of Stiles is made by mixing "activated carbon particles with a gel forming material". Although the use of carbon as an adsorbent is often desirable, in that carbon has a high adsorption capacity, it possesses poor oxidation stability. In fact, at temperatures as low as 300° C. carbon can begin to combust, as is shown in "Catalytic Oxidation of Vapors Adsorbed on Activated Carbon", *Environmental Science and Technology*, 9,846 (1975). This poor oxidation stability for carbon adsorbents is a major disadvantage, since at the higher temperatures at which the organic substrate is combusted carbon itself may undergo combustion. As a result, carbon can usually only be used to treat very dilute streams at ambient or slightly above ambient temperatures. Furthermore, the adsorptive capacity of carbon decreases at elevated temperatures. Consequently, desorption is rapid at elevated temperatures, and as combustion begins the consequent heat release causes a large quantity of organic substrate to be suddenly released. Unless combustion on the catalyst is extremely efficient, which usually is not the case, or the catalyst bed is very deep there will be emission of the organic substrate into the effluent stream and subsequently out of the system as a pollutant.

To overcome the problems associated with using carbon as the adsorbent U.S. Pat. No. 3,658,724 discloses that other adsorbent materials, other than carbon, may be used. Among the materials disclosed are silica, alumina or various metal oxides. Although these materials have enhanced thermal stability they also have relatively low adsorptive capacities and consequently the organic substrate is only very weakly bound to them. Because of this weak binding, when combustion or heating occurs the organic substrate tends to be readily desorbed and passes into the effluent stream uncombusted. In addition, the low adsorptive capacities of these materials preclude the accumulation of sufficient organic substrate to generate a large temperature rise in the catalyst bed. As a result, the organic substrate is not heated sufficiently and incomplete combustion of the organic substrate occurs.

In addition to the above adsorbent materials, U.S. Pat. No. 3,658,724, to Stiles, discloses that molecular sieves may be used as the adsorbent with a combustion catalyst. This general reference to molecular sieves is inadequate, in several respects, in solving the many problems associated with the combustion of an organic substrate in a dilute stream. Firstly, the term "molecular sieve" refers to a wide variety of materials, many of which are unsuitable for an adsorption/combustion process. For example, some molecular sieves are amorphous and thus lack the crystalline structure necessary for use in an efficient adsorption/combustion process. In addition, one class of molecular sieves are the zeolites. However, zeolites are not in general sufficiently thermally stable to withstand the temperatures that would be expected to occur during an adsorption/combustion process. In fact, they often lose their crystallinity at less than 600° C. Ordinary zeolites tend also to strongly adsorb water, a product of combustion, and only very weakly adsorb organics, thus making them unsuitable for an efficient adsorption/combustion process.

Stiles, at column 2, lines 14 et seq., discloses the use of an adsorbent by first adsorbing the organic substrate on the adsorbent and then after a substantial amount has been adsorbed, the substrate is driven from the adsorbent by heating. As the organic substrate in this case leaves the adsorbent, at least a portion of the substrate is expected to contact an oxidation catalyst incorporated within and on the surface of the adsorbent. Thus, the ultimate process results in some of the organic substrate desorbing uncombusted into the dilute stream since the substrate may not necessarily have contacted the oxidation catalyst after it leaves the adsorbent and consequently the substrate passes uncombusted into the dilute effluent.

The use of high-silica zeolites for the combustion of an organic substrate is disclosed in co-pending U.S. patent application Ser. No. 864,835, filed Dec. 27, 1977. This application discloses a "Steady State" combustion process for the combustion of an organic substrate to essentially carbon dioxide and water. The disclosed process oxidatively combusts the organic substrate by contacting the preheated organic substrate with a catalyst bed comprising a high-silica zeolite. When the preheated organic substrate contacts the catalyst bed a "Steady State" combustion of the organic substrate takes place. The process requires that the organic substrate be preheated to a relatively high minimum temperature before it contacts the catalyst bed in order that a high percentage of the organic substrate be combusted to essentially carbon dioxide and water, as discussed in the context of example 3-9 hereof.

The present invention overcomes the difficulties of the prior art by utilizing the unique properties of high-silica zeolites in an adsorption and combustion process. It has been found that the high-silica zeolites have an unusually strong adsorption affinity for organic compounds, i.e. organophilicity. The very high organophilicity and, in addition, the hydrophobicity of these zeolites make them ideally suited for use in the oxidative combustion of an organic substrate. In addition, the thermal and hydrothermal stability of these zeolites make them well suited for combustion of even the most refractory organic substrate.

It has been discovered that these high-silica zeolites, when containing a suitable combustion catalyst, may be used in an adsorption/combustion process involving the adsorption of the organic and subsequent combustion of the organic substrate with the metal-containing zeolite.

Thus, the present process, as distinguished from the prior art, provides a process wherein a high-silica zeolite, containing a suitable combustion catalyst such as Pt, Pd, Cu, Ni, Cr, and Mn, adsorbs and combusts an organic substrate without the necessity of preheating the organic substrate to a high temperature prior to contact with the metal containing high-silica zeolite and, further without desorption of uncombusted substrate into the effluent. These advantages and other will be more fully discussed hereinafter.

SUMMARY OF THE INVENTION

In accordance with the process of the invention a novel adsorption/combustion process is provided for the combustion of an organic substrate and more particularly, provides a process for the adsorption and combustion of an organic substrate contained in a dilute stream.

The process comprises intimately contacting the organic substrate, temperature at about or below the "Temperature of Ignition" of the substrate, with an adsorption/combustion catalyst bed comprised of a metal-containing zeolite, in the presence of an oxygen-containing gas. The oxygen-containing gas may be air or it may contain lower or higher concentrations of oxygen in combustion with one or more other gaseous components such as, but not limited thereto, nitrogen, helium and an auxiliary fuel such as methane, propane or other combustible hydrocarbons.

The zeolite is a high-silica zeolite that is both thermally and hydrothermally stable for the particular combustion conditions and is organophilic/hydrophobic. The metal contained in the metal-containing zeolite is at least one of platinum, palladium, copper, nickel, chromium, and manganese.

The "Temperature of Ignition", referred to above, (hereinafter abbreviation as "Ti") is the temperature at which, if the organic substrate to be combusted were contacted with a perfectly insulated adsorption/combustion catalyst bed of sufficient length, combustion would begin and would be expected to cause an adiabatic temperature rise sufficient to drive the combustion toward completion, i.e. about 100% combustion.

Since the organic substrate is at a temperature of at about or below Ti of the organic substrate for the specific catalyst and carrier gas, it is not completely combusted as it intimately contacts the catalyst bed, which is at about or below the temperature of ignition of the organic substrate. The organic substrate which is uncombusted remains adsorbed by the catalyst bed until sufficient organic substrate has been adsorbed, as determined by the molar heat capacity of the particular substrate, at which time the organic substrate is combusted, by an adiabatic temperature rise in the catalyst bed. This adiabatic temperature rise occurs without additional heat input to the catalyst bed as the exothermic combustion of the organic substrate occurs. Prior to the adiabatic temperature rise in the catalyst bed, the temperature of the catalyst bed is maintained at or intermittently heated to about the temperature of ignition of the organic substrate. The above-described "adsorption/combustion behavior" is characteristic of the process of the invention.

After the adsorbed organic substrate has been combusted, as evidenced by a maximum in the temperature of the catalyst bed or a maximum in the concentration of carbon dioxide in the effluent, the temperature of the catalyst bed decreases until it is at about or below the temperature of ignition of the substrate.

The following detailed description of the invention will further illustrate the novel features of the present invention.

DETAILED DESCRIPTION OF THE INVENTION

Figure 1:
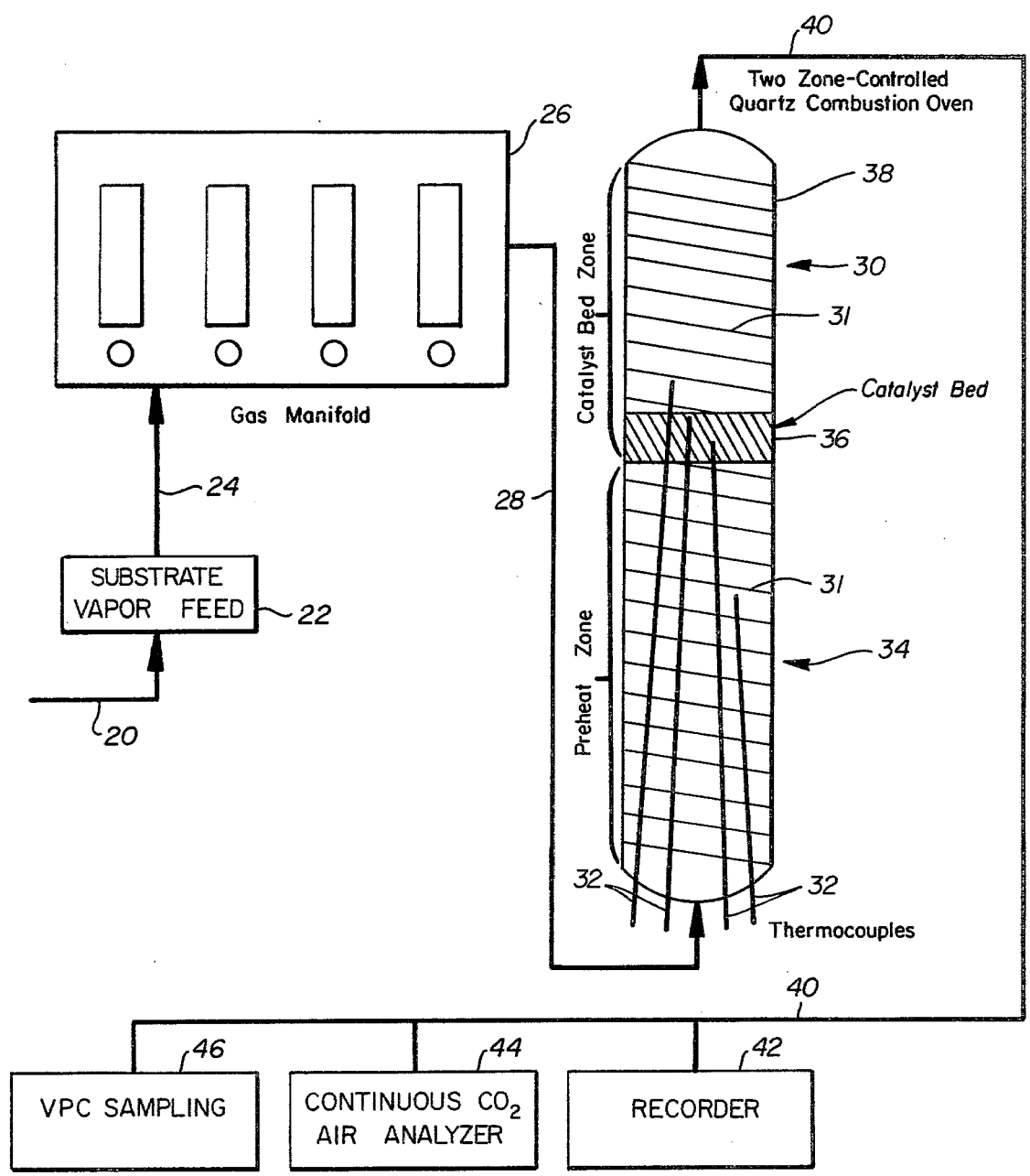
FIG. 1 shows a schematic drawing of a gas-flow apparatus for carrying out the process of the present invention.

The process of the present invention overcomes the problems associated with processes known to the prior art by combining the salient features of adsorption and combustion to afford a workable and efficient process for combusting an organic substrate and, further, for treating dilute organic vapor streams.

The novel process of the invention utilizes the unusual properties of high-silica zeolites, i.e. those having a $SiO_2/Al_2O_3$ molar ratio which exceeds about 10 and preferably about 20. It has been found that these high-silica zeolites are organophilic and hydrophobic, that is, they tend to adsorb organic compounds very strongly and water very weakly. Although the adsorptive capacity of zeolites is usually not as high as carbon adsorbents at temperatures below 300° C., only being on the order of 15 weight percent, they have other highly desirable properties which carbon and non-high-silica adsorbents do not posseses.

It has been found that these high-silica zeolites, unlike the aluminas, maintain a relatively high adsorption capacity evan at a temperature of 200° C. This behavior is to be distinguished from that of conventional zeolites, e.g. Zeolite A, U.S. Pat. No. 2,882,243; Zeolite X, U.S. Pat. No. 2,882,244; , and Zeolite Y, U.S. Pat. No. 3,216,789; which tend to strongly adsorb water and only weakly adsorb an organic substrate. In addition, the thermal and hydrothermal stabilites of these high-silica zeolites are often hundreds of degrees Centigrade higher than those of conventional zeolites, i.e. in excess of 600° C.

The above-mentioned high-silica zeolites may be used so as to circumvent most of the problems associated with the previously discussed adsorbents, but the basic problem remains of using an adsorbent to concentrate the organic substrate and then subsequently desorbing it in order to contact the combustion catalyst, i.e. metal or metal ion, such that no or essentially no substrate is emitted to the effluent. This problem is obviated by introducing the combustion catalyst into the framework of the high-silica zeolite to form a metal-containing high-silica zeolite which exhibits both unique adsorption and combustion characteristics. Because these high-silica zeolites have the capacity to undergo ion-exchange, metals or metal ions which can serve as the combustion catalyst may be conveniently introduced directly into the zeolite framework. As a result, even before the organic substrate can be desorbed, the substrate comes into contact with the combustion catalyst which has been introduced directly into the zeolite framework. Thus, the use of the metal-containing high-silica zeolites, hereinafter referred to as the adsorption/combustion catalyst, enables the organic substrate to remain adsorbed until the temperature of the substrate is sufficiently high to achieve complete combustion of the organic substrate and then subsequent to combustion the adsorption/combustion catalyst readily desorbs the water formed by combustion. The desorption of water aids in preventing poisoning of the combustion sites of the metal-containing high-silica zeolite and in preventing incomplete combustion which results from poisoning of combustion sites.

The metal-containing high-silica zeolites of the present invention are prepared by introducing a suitable metal, or metal ion, such as Cu, Pt, Pd, Ni, Cr and Mn or mixtures thereof into the high-silica zeolite framework. As will be evident from the nature of the process and from the following examples, any zeolite or zeolite-like adsorbent material having a high adsorption affinity for organic substrates will function as the adsorbent material for the adsorption/combustion catalyst. However, in order to achieve the most desirable results, the adsorbent should preferably have certain additional characteristics, as follows:

Firstly, the adsorbent material should be metal ion-exchanged, -doped, or loaded sufficiently so as to provide an efficient amount of combustion catalyst within or on the adsorbent. The amount of combustion catalyst is considered efficient when the organic substrate has a low $T_i$ with complete or nearly complete combustion.

Secondly, the adsorbent material should preferably be formed into relatively large particles or pellets, e.g. 8–20 mesh pellets rather than a loose, discrete powder, so as to impede heat transfer in the catalytic bed and thus facilitate a rapid temperature rise within the catalyst bed with concomitant combustion of the organic substrate. The use of a pelletized catalyst bed also helps to maximize the flow of organic substrate through the catalyst bed.

Thirdly, the metal-containing adsorbent material should readily desorb water, i.e., be hydrophobic, above, at and below the $T_i$ of the organic substrate. This characteristic facilitates desorption of water which may otherwise interfere with the combustion sites of the metal-containing adsorbent material.

Fourthly, the adsorbent material should be thermally stable and in addition, be thermally stable in the presence of steam; that is, it should have thermal and hydrothermal stability at the temperatures at which combustion occurs. Typically a thermal and hydrothermal stability of at least 600° C. is suitable for the present invention although this value depends on the organic substrate combusted and the chosen process parameters, e.g. flow rate, carrier gas, water content and operating temperatures.

In general, any zeolite, a crystalline material having an intra crystalline void volume, having a silica to alumina ratio greater than 10, preferably greater than 20, will be found to perform satisfactorily as the zeolite for forming the metal-containing high-silica zeolite.

Representative of those high-silica zeolites having the above-identified properties, but not limited thereto, are "silicalite", ZSM-5, ZSM-8, ZSM-11, ZSM-12, Hyper Y, ultrastabilized Y, hereinafter designated "ultra-Y", Beta, mordenite and erionite. It is to be understood that other zeolites having the properties described herein may be used without departing from the scope of the present invention. "Silicalite" is a novel crystalline silica composition having a hydrophobic/organophilic characteristic which permits its use for selectively adsorbing organic materials preferentially to water. Silicalite is more completely described in U.S. Pat. No. 4,061,724, assigned to Union Carbide Corporation. It is described in claim 1 of said patent as, "A" silica polymorph consisting of crystalline silica, said silica polymorph after calcination in air at 600° C. for 1 hour, having a mean refractive index of 1.39±0.01 and a specific gravity at 25° C. of 1.70±0.05 g./cc." and in claim 2 as, "A" silica polymorph consisting of crystalline silica, said silica polymorph after calcination in air at 600° C. for 1 hour having as the six strongest d-values of its X-ray powder diffraction pattern those set forth in Table A."

Table A is as follows:

TABLE A

| d-A | Relative Intensity[a] |
|---|---|
| 11.1 ± 0.2 | VS |
| 10.0 ± 0.2 | VS |
| 3.85 ± 0.07 | VS |
| 3.82 ± 0.07 | S |
| 3.76 ± 0.05 | S |
| 3.72 ± 0.05 | S |

[a]VS = Very Strong;
S = Strong

The preparation of silicalite is set forth in Examples 3, 5, 6 and 7, of U.S. Pat. No. 4,061,724, which examples are incorporated herein by reference.

The above-mentioned ZSM-type zeolites are described in various U.S. Patents and Foreign Patents as follows:

ZSM-5 is a crystalline zeolite and is disclosed in U.S. Pat. No. 3,702,886. The preparation of ZSM-5 is set forth in Examples 1, 2, 6, 22, 26 and 27 of U.S. Pat. No. 3,702,886, which examples are incorporated herein by reference.

ZSM-8 is a crystalline zeolite and is disclosed in British Specification No. 1,334,243, published Oct. 17, 1973.

ZSM-11 is a crystalline zeolite and is disclosed in U.S. Pat. No. 3,709,979.

The preparation of ZSM-11 is set forth in Examples 1, 2, 4, 5, 8 and 10 of U.S. Pat. No. 3,709,979, which examples are incorporated herein by reference.

ZSM-12 is a crystalline zeolite and is disclosed in U.S. Pat. No. 3,832,449. The preparation of ZSM-12 is set forth in Examples I, II, III, IV, V, VI, VII and VIII of U.S. Pat. No. 3,832,449, which examples are incorporated herein by reference.

U.S. Pat. Nos. 3,702,886 (ZSM-5), 3,709,979 (ZSM-11), and 3,832,449 (ZSM-12) are commonly assigned to Mobil Oil Corporation, New York, N.Y.

Ultrastabilized Y, i.e. ultrastabilzed form of zeolite Y, is a form of zeolite Y which has been treated to give it the organophilic characteristic of the adsorbents of the present invention. A description of ultrastabilized Y is found in "Crystal Structures of Ultrastable Faujasites", Advances in Chemistry Series, No. 101, American Chemical Society, Washington, D.C., pages 266-278 (1971).

In addition to the above-mentioned high-silica zeolites, a particularly well suited high-silica zeolite, the zeolite used in the illustrative examples of the present invention, is the class of high-silica zeolites designated and hereinafter referred to as Adsorbent 1.

Adsorbent 1 comprises a class of zeolites, described more fully in co-pending U.S. patent application Ser. No. 655,065, filed Feb. 4, 1976, said class of zeolites comprising zeolite compositions which are readily composed by preparing an organic-free reaction mixture. These zeolite compositions are highly siliceous and can contain an extraordinarily high amount of divalent metal cations. Further, the organophilicity and hydrophobicity of these zeolite compositions make them ideally suited for the present invention. In addition, the high thermal and hydrothermal stabilities of these zeolite compositions, i.e. in excess of 600° C., make them ideally suited for even the most refractory organic substrate.

The Adsorbent 1 compositions, abbreviated hereinafter as AD (1) exhibit an aluminosilicate crystal structure wherein at least some of the $AlO_4-$ tetrahedra thereof are associated with, i.e. electrovalently neutralized by, a metal cation.

The composition of these zeolites in the dehydrated state can be expressed empirically in terms of moles of oxides as follows:

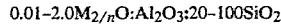

$$0.01-2.0 M_{2/n}O:Al_2O_3:20-100SiO_2$$

wherein M represents at least one metallic cation and n represents the valence of M as prepared from reaction mixture free of organic cations, as hereinafter described.

These zeolites may also be exchanged with ammonium, or other cations, including metal ions, hydrogen ions, rare earth ions and mixtures thereof by contacting the zeolite with solutions containing one or more of the desired cations.

In conjunction with the aforesaid chemical composition, these zeolites, i.e. Ad (1) compositions, possess a distinguishing crystalline structure characterized by an X-ray powder diffraction pattern having at least the following interplanar spacings:

TABLE I

| Interplanar Spacing, d (A) |
|---|
| 11.1 ± 0.2 |
| 10.1 ± 0.2 |
| 3.85 ± 0.07 |
| 3.74 ± 0.05 |
| 3.72 ± 0.05 |

These values were determined by standard techniques. The radiation was the K-alpha doublet of copper, and a scintillation-counter spectrometer with a strip-chart pen recorder was used. The peak heights and the peak or line position as a function of two times theta ($\theta$), where theta is the Bragg angle, were read from the spectrometer chart. From these, the relative intensities and d (observed), the interplanar spacing in A, corresponding to the recorded lines, were determined.

Ion-exchange of the original cations by other cation species does not substantially alter the X-ray pattern of Adsorbent 1, but some minor shifts in interplanar spacing and variations in relative intensity can occur. Other minor variations can occur depending on the silica-to-alumina ratio of the particular sample and whether or not the sample had been subjected to elevated temperatures. In any event the d-spacings of the X-ray pattern will be within the tolerances indicated in Table 1.

In conjunction with the aforesaid chemical composition and X-ray powder diffraction pattern, Ad (1) compositions exhibit certain distinguishing infrared absorption characteristics. Infrared analytical techniques are recognized as highly useful in the study of crystalline zeolites; see for example U.S. Pat. Nos. 3,506,400 and 3,591,488 to Eberly et al., issued Apr. 14, 1970 and July 6, 1971, respectively, and E. M. Flanigen, H. Khatami and H. A. Szymanski, "Adv. Chem. Series"., Vol. 101, 1971 (pg. 201 et seq.).

Infrared analysis was also employed to characterize these siliceous zeolites. Spectra were obtained on a Perkin-Elmer Model 112 single-beam instrument for the hydroxyl-stretching region 3800-3000 cm$^{-1}$, on a Perkin-Elmer Model 621 double-beam instrument for both the mid-infrared region 1600-1300 cm$^{-1}$ and the framework region 1300-3000 cm$^{-1}$. After calcination at 600° C. in air, the samples were run as self-supported wafers (20 mg.), and the spectra in the hydroxyl-stretching region were obtained after thermal treatments at 200° C. in vacuum for two hours.

Specific metal-containing high-silica zeolite compositions, i.e. adsorption/combustion catalysts, which are preferred in the process of the present invention include catalysts comprising Adsorbent 1 with at least one of the metals Cu, Pt and Pd. These preferred catalysts are hereinafter designated by the abbreviations Cu-Ad (1), Pt-Ad (1) and Pd-Ad (1), wherein these abbreviations designate metal or metal ions of Cu, Pt or Pd introduced directly into the framework of Adsorbent 1. Pt-ultra-Y and Pd-ultra-Y are also preferred adsorption/combustion catalysts. In addition, the ZSM-5 type zeolites i.e. ZSM-8, ZSM-11 and ZSM-12, hereinbefore, described, are preferred adsorption/combustion catalysts when in an appropriately metal-containing form, i.e. when a suitable combustion catalyst is introduced into the framework of these high-silica zeolites.

It is suggested, although the scope of the invention is not to be contrued as limited thereby, that the above-discussed metal-containing high-silica zeolite functions in the present invention, comprising a novel adsorption/combustion process for the combustion of an organic substrate, as follows:

The organic substrate is first adsorbed on the metal-containing high-silica zeolite bed, i.e. the adsorption/combustion catalyst bed, by intimately contacting the organic substrate with the adsorption/combustion catalyst bed. The organic substrate is adsorbed by the adsorption/combustion catalyst bed until sufficient organic substrate is adsorbed, as determined by the molar heat of combustion of the substrate, at which time an adiabatic rise in temperature occurs in the adsorption/combustion catalyst bed which in its entirety or a portion thereof, has been maintained at or heated to about the temperature of ignition of the organic substrate by auxiliary heaters. The organic substrate undergoes combustion, essentially complete combustion to essentially $CO_2$ and $H_2O$, in the presence of an oxygen-containing gas, concomitant with the adiabatic temperature rise in the catalyst bed.

It has been discovered that if the catalyst bed is intermittently heated to or is maintained at or only slightly above the temperature of ignition, the organic substrate which is introduced below its temperature of ignition, is only partially combusted as it intimately contacts the adsorption/combustion catalyst bed. Instead of passing uncombusted through the adsorption/combustion catalyst bed, however, the organic substrate is adsorbed by the strongly organophilic adsorption/combustion catalyst bed. Some degree of combustion occurs continuously by virtue of temperature of the catalyst bed being maintained at or only slightly above the temperature of ignition of the organic substrate, either continuously or intermittently, by auxiliary heating. In addition, the heat generated by the burning organic substrate and supplied by auxiliary heating is not readily lost by the catalyst bed since heat transfer within the catalyst bed does not readily occur.

When sufficient substrate has been adsorbed by the adsorption/combustion catalyst bed the fuel value of organic substrate adsorbed by the catalyst bed, as determined by the molar heat of combustion of the organic substrate, exceeds that which could be lost by heat transfer to the passing gas, and a rapid, adiabatic temperature rise occurs within the catalyst bed with combustion of the adsorbed organic substrate. The heat transfer between the catalyst bed and the adsorbed organic substrate is rapid and the adsorbed organic substrate is quickly brought to a temperature sufficient to attain 100% combustion prior to desorption of the organic substrate at the substrate's now elevated temperature. After combustion the products of combustion, essentially $CO_2$ and $H_2O$, are rapidly desorbed by the catalyst bed and pass into the effluent gas stream.

After the adsorbed organic substrate is combusted the exceedingly hot catalyst bed slowly transfers the heat imparted to it by the combustion of the organic substrate, to the dilute gaseous stream that carries the organic substrate, although while hot the catalyst bed can burn completely any organic substrate which it contacts. However, combustion cannot be maintained at these higher temperatures, because the amount of organic substrate in the dilute gaseous stream is insufficient to supply the heat necessary to adiabatically maintain the catalyst bed above the temperature at which 100% combustion occurs. Therefore, after all adsorbed substrate has been combusted the catalyst bed temperature decreases to about or below the temperature of ignition of the organic substrate in the dilute stream. As the catalyst bed cools, it once again begins to adsorb organic substrate. The catalyst bed cools to the lowest temperature permitted by the auxiliary heaters, about the temperature of ignition or below, and remains at that temperature until sufficient organic substrate is adsorbed by the catalyst bed at which time combustion occurs. This adsorption of organic substrate by the adsorption/combustion catalyst bed and its subsequent combustion, with the concomitant adiabatic increase and decrease in the temperature of the adsorption/combustion catalyst bed, is an "adsorption/combustion cycle."

In practicing the process of the invention the dilute gaseous stream is preferably passed through an adsorption/combustion catalyst bed in which the adsorption/combustion catalyst is in the form of pellets. This is preferred because heat transfer within the catalyst bed tends to be less between the relatively large pellets of a pelletized catalyst bed, e.g. 8-20 mesh pellets, than in a catalyst bed formed by powdered adsorption/combustion catalyst. This does not mean that a powdered adsorption-combustion catalyst cannot be used to prepare the catalyst bed, but that the preferred form of the catalyst is that of pellets. This, in part, also arises from the fact that the use of a powdered catalyst bed limits the amount of gaseous stream that may be passed through the catalyst bed, within a given time period, since the powdered catalyst forms a more tightly packed catalyst bed which reduces the volume of the gaseous stream which may be passed through the catalyst bed in a given period of time.

From the aforementioned description of the present invention it can be seen that the physical properties of the particular adsorption/combustion catalyst will be relevant in optimizing the adsorption/combustion process.

Clearly, any organic substrate having a size too large to permit adsorption by the adsorption/combustion catalyst, under the particular process conditions, cannot be combusted by the adsorption/combustion process. This does not mean to say that organic substrates larger than the pore size of the adsorbent cannot be adsorbed by the adsorption/combustion catalyst. Organic substrates having branched substituents that are not larger than the pore size can be adsorbed by the adsorbent material even though only a portion of the substrate is adsorbed.

Typical of the components of which the organic substrate of the present invention may be comprised are ketones, alcohols, paraffins, olefins, aromatics including mono- and polynuclear compounds such as benzene, naphthalene and corresponding alkyl-substituted compounds, cycloparaffins, halogen-substituted paraffins, halogen-substituted aromatics, nitro-substituted paraffins, nitro-substituted aromatics, ethers, amines, and combinations thereof. It is to be understood that the substrate may be comprised of other components without departing from the scope of the present invention. The adsorptivity of the adsorption/combustion catalyst for the organic substrate is affected by the boiling point of the organic substrate in that a lower boiling substrate tends to be adsorbed to a lesser extent than a higher boiling substrate. As a result, the concentration of a stream which may be treated by the method of this invention will vary somewhat according to the particular components of the organic substrate present in the stream. The limiting range of the concentration is most conveniently found empirically, although the effective concentration limits for any stream can be determined from the adsorption capacity of the adsorption/combustion catalyst for the organic substrate.

In addition, the temperatures for the lower and upper temperatures of the adsorption/combustion cycle are for the most part determined by the particular adsorption/combustion catalyst chosen.

The lower temperature of the cycle should preferably be chosen to be at or near the temperature of ignition of the organic substrate, although it may be below the temperature of ignition. The upper temperature of the cycle is at or near the maximum temperature of combustion allowable for the adsorption/combustion catalyst chosen.

For the particular adsorption/combustion catalysts used to illustrate, infra, the process of the invention, i.e. Cu-Ad (1) and Pt-Ad (1), these values have been determined using toluene as the organic substrate, to be as follows:

For example, for catalyst Cu-Ad (1) these values are about 200° C. and 800° C., respectively, and for catalyst Pt-Ad (1) these values are about 60° C. and about 900° C., respectively.

The upper temperature of the adsorption/combustion cycle can be conveniently lowered by raising the lower temperature of the cycle, whereby the cycles will occur more frequently, are of shorter duration and are less exothermic, hence the upper temperature of the cycle is lowered. The maximum temperature range for the adsorption/combustion cycle is produced for any given organic substrate by maintaining the lower temperature of the cycle at the temperature of ignition for that organic substrate.

Figure 2:
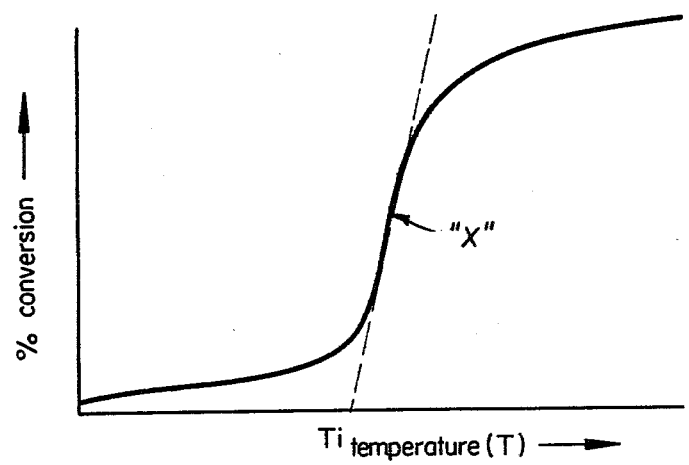
FIG. 2 illustrates a plot of the % combustion of organic substrate v. temperature wherein said plot defines the "Temperature of Ignition"

The above discussion refers to the "Temperature of Ignition ($T_i$)" for the present invention, which has previously been generally defined as the temperature at which, if the organic substrate is contacted with a perfectly insulated catalyst bed of sufficient length, combustion would begin and would be expected to cause an adiabatic temperature rise sufficient to drive the combustion toward completion. For purposes of characterizing the process of the invention $T_i$ is determined by experimentally determining a curve by plotting the percent combustion, measured by the formation of $CO_2$, versus the temperature (T) at which the sample was taken, for gradually increasing values of T. The generated curve will have the shape generally known as an "S" shape. FIG. 2 illustrates such an "S" shaped curve. Such a curve will have a point of inflection, whereat the rate of increase of conversion of substrate to $CO_2$ will be at a maximum value at a particular given temperature value for a given organic substrate. If such a curve is described mathematically, the point of inflection can be readily located by determining the value of T for which the second derivative of the curve's mathematical expression is zero. However, the point of inflection can easily be estimated graphically. As shown in FIG. 2, the inflection point is simply the point on the curve where the conversion is changing the most or where the slope of the curve is greater. In FIG. 2 this point can be estimated to be at the point designated by "X". A straight line is then drawn through the point of inflection, tangent to the curve, and extrapolated to intersect the temperature axis. The dashed line illustrates such an extrapolation. The temperature at which the extrapolated line intersects the temperature axis is the "Temperature of Ignition ($T_i$)".

In addition to the temperature of ignition two additional temperatures, related to the combustion of the organic substrate, are relevant to the present invention. These are the "minimum temperature of 100% combustion" and the "minimum temperature of zero emission" and are defined as follows:

The "minimum temperature of 100% combustion" is defined as the temperature to which the gas stream must be preheated so that when no additional heat, other than the heat supplied in preheating the gas stream, is supplied to the combustion catalyst bed there is 100% combustion of the organic substrate. This type of combustion is commonly referred to as "Conventional" or "Steady State" combustion. The use of copper containing high-silica zeolites for combustion, i.e. "Steady-State" combustion, of an organic substrate is disclosed in copending U.S. patent application Ser. No. 864,835, filed Dec. 27, 1977, as hereinbefore described. The combustion disclosed therein is compared to the instant adsorption/combustion process, in the examples 2–12 by including in the illustrative examples, for comparative purposes, the "minimum temperature of 100% combustion" for each substrate combusted by the present invention.

The "minimum temperature of zero emission" is defined as the minimum temperature the catalyst bed can be allowed to reach while still providing zero organic substrate emission when the organic substrate is introduced into intimate contact with the catalyst bed at a temperature below the temperature of ignition of the organic substrate.

A procedure for experimentally determining the "minimum temperature of 100% combustion" and the "minimum temperature of zero emission" is set-forth hereinafter in example 1.

The adsorbent materials used in the present invention, preferably high-silica zeolites, have been previously discussed as generally being organophilic and hydrophobic. The organophilic/hydrophobic character of a particular adsorption/combustion catalyst may be determined by reference to the hexane "delta-loading" factor. The "delta-loading" for a particular adsorbent may be determined as follows:

The hexane "delta-loading", i.e. the weight percent of hexane adsorbed by the adsorbent material, may be determined by equilibrating a sample of the adsorbent material in a McBain Bakr apparatus with water vapor at slightly below the saturation pressure (e.g., 30 torr) at ambient temperature. With the water vapor remaining in the system about 50 torr of n-hexane is introduced into the system and the system is brought to equilibrium. The adsorption of n-hexane over and above the water vapor equilibrated sample is the delta-loading. This value is then compared to the adsorption of n-hexane of a sample which has not been exposed to water vapor. The "delta-loading" as a percent of this latter value is a means of measuring the organophilicity of the adsorbent material and is hereinafter referred to as the "delta-loading factor". This method relies on the requirement that the pore size of the zeolite is large enough to adsorb n-hexane. A "delta-loading factor" of 0.5 or greater is generally considered to indicate that the adsorbent material is organophilic.

Alternatively, if the pore size of the zeolite is too small to adsorb n-hexane, the "hydrophobicity" of the adsorbent material may be determined by comparing the amount of water adsorbed at the vapor pressure of the ice-point (i.e., about 4 torr) to the amount adsorbed at slightly below (i.e., about 20 torr) ambient saturation. The difference, expressed as a percent, is a measure of the hydrophobicity of the adsorbent material. Although this value is not a measure of hydrophobicity as that term is generally used, this value does relate to the amount of hydrophilicity retained by the adsorbent material. In the case of conventional zeolites, which tend to be strongly hydrophilic, their "hydrophobicity" as measured according to this procedure will be only a few percent. In the case of high-silica zeolites which are weakly hydrophilic, i.e. organophilic by the n-hexane "delta-loading" test, the "hydrophobicity" will be substantially higher. Therefore, the terms "organophilic"

and "hydrophobic" are both terms which may be used to describe the adsorption characteristics of a particular adsorbent material.

In order to more easily describe the conditions under which the instant process is carried out in the illustrative examples hereinafter, the rate at which the substrate-containing dilute stream passes through the adsorption/combustion catalyst is expressed by reference to the "space velocity". The space velocity (SV) is defined as the volume of gas (V) passing through a given volume of catalyst space (Vc) divided by the catalyst space (Vc), i.e. $SV = V/Vc$. A space velocity of 10,000 $hr^{-1}$ means that the equivalent of V/Vc is equal to 10,000.

Gas Flow Apparatus

In carrying out the process of the invention a gas flow apparatus, as shown in FIG. 1, is used. Although other gas flow apparatae may be used, the apparatus shown in FIG. 1 serves to illustrate the important features of a suitable gas flow apparatus and illustrate the gas flow apparatus used for both the illustrative and comparative examples discussed hereinafter.

In the process of the present invention the adsorption/combustion catalyst is introduced into a suitable adsorption/combustion container of a gas flow apparatus. FIG. 1 illustrates a schematic drawing of a gas flow apparatus for the invention wherein the adsorption/combustion container is designated by the numeral 30 and the adsorption/combustion catalyst bed is designated by the numeral 36. Container 30 comprises a tubular reaction container having two zones 34 and 38 heated by auxiliary thermostated heaters 31 with corresponding thermocouples 32 to measure the temperature at various points in the reaction container, i.e. before the catalyst bed, at the lower region of the catalyst bed, at the upper region of the catalyst bed and after the catalyst bed. The organic substrate enters the apparatus and passes through substrate vapor feed 22 to gas manifold 26, and from gas manifold 26 the substrate passes through line 28 and is introduced into the lower zone of reaction container 30 at which point the substrate is preheated, if necessary, in preheat zone 34, packed with quartz chips, and subsequently is adsorbed by adsorption/combustion catalyst 36. Adsorption continues and organic substrate concentration within the adsorption/combustion catalyst bed increases. By means of heaters 31 the temperature of the catalyst bed or a portion thereof is maintained at or intermittently heated to about the temperature of ignition which results in some minimal level of continuous combustion of the organic substrate. When sufficient organic substrate has been adsorbed by the adsorption/combustion catalyst bed, the fuel value of the substrate adsorbed on the catalyst bed exceeds that which could be lost by heat transfer to the passing gas stream, and a rapid, adiabatic temperature rise of the catalyst bed occurs and combustion of the organic substrate is driven to completion. After combustion of the adsorbed substrate the catalyst bed eventually cools to the lowest temperature permitted by auxiliary heaters 31, and remains at a temperature at or below the temperature of ignition of the substrate until sufficient fuel is adsorbed on the catalyst bed, at which time combustion of the adsorbed organic substrate is repeated.

The gases generated by combustion of the organic substrate, comprising essentially $CO_2$ and $H_2O$, together with any other gases in the stream, exit the reaction container through line 40 and exit the system. The effluent gaseous stream is monitored by passing the effluent gas stream into a continuous $CO_2$ infrared analyzer 44 and/or a vapor phase chromatograph 46. Recorder 42 provides continuous recording of the concentration of $CO_2$ in the effluent stream, and the temperatures of the lower and upper portions of the catalyst bed, all as a function of time.

Catalyst Preparation

In accordance with the process of the present invention, as above-described, an organophilic high-silica zeolite is prepared such that the silica to alumina ratio is about 20 or greater. This high-silica zeolite, the zeolite used in the examples illustrating the instant process, is prepared by initially forming a reaction mixture, as follows, by:

(a) dissolving 1.98 pounds of reagent-grade NaOH in 13.2 pounds of water at 95° C. with agitation:
(b) dissolving 1.19 pounds of sodium aluminate into the solution of (a);
(c) thoroughly mixing 54.4 pounds of "LUDOX LS", aqueous colloidal silica sol (30 wt. % $SiO_2$), and 120 pounds of water in a 100-gallon kettle;
(d) mixing 1.98 pounds of a "ZSM-5-type" zeolite crystals with 2 pounds of water;
(e) mixing the hot solution of (b) into the silica-water mixture of (c);
(f) adding the crystal-water mixture of (d) to the mixture of (e); and
(g) agitating the mixture of (e) for 5 minutes.

The reaction mixture formed above is maintained at a temperature of about 150° C. for about 120 hours. The solid reaction product is separated from the liquor by filtration, washed with 100 gallons of water and dried. Upon chemical analysis the reaction product is determined to have the following composition:

| | |
|---|---|
| Wt. percent $Na_2O$ | 3.1 |
| Wt. percent $Al_2O_3$ | 3.3 |
| Wt. percent $SiO_2$ | 82.0 |
| Wt. percent C | 0.8 |
| Wt. percent N | 0.06 |
| Loss on Ignition (LOI) | 9.2 |

A sample of the reaction product, when submitted for X-ray powder diffraction analysis, is identified as a zeolite having a characteristic X-ray powder diffraction pattern containing at least the d-spacings of Table I.

The product filter cake of the above zeolite is made up into ⅛ inch pellets by blending the filter cake with acid-peptized alumina, in a weight ratio of 80 parts of anhydrous zeolite product to 20 parts alumina, and extruding this blended mixture. The extruded pellets are calcined for 2 hours at 600° C. The above-prepared high-silica zeolite is determined to be the high-silica zeolite previously designated as Adsorbent 1.

Further, in accordance with the present invention, the above-formed pellets of Adsorbent 1 are used to prepare an adsorption/combustion catalyst for the present invention as follows:

One hundred grams of the Adsorbent 1 pellets are added to a freshly filtered copper (II) chloride hydrate solution, prepared by dissolving 107.2 g of the copper (II) chloride hydrate in 2000 milliliters of distilled water. The solution and Adsorbent 1 pellets are gently refluxed for three hours at which time the supernatant is decanted off. This process is repeated two additional times, for a total of three, and then the pellets are washed at room temperature for 1 hour with 2000 milliliters of distilled water with an occasional gentle swirling. The filtered pellets are then dried at 100° C. This adsorption/combustion catalyst is the catalyst previously designated as and is herein designated as catalyst Cu-Ad (1). The catalyst Cu-Ad (1) pellets are activated by passing a stream of air containing 16 mole percent $NO_2$ at temperatures from 25° C. to 250° C. over the catalyst pellets for a period of 1 hour, followed by 1 hour at 350° C. in an air purge. Chemical analysis of a sample of this catalyst indicates that 7.3% copper, by weight, is present.

In addition, a second adsorption/combustion catalyst is prepared, in a manner similar to that above-described for catalyst Cu-Ad (1), except that an aqueous solution containing 0.013 mole of tetramine platinum (II) chloride per liter of water is used as the metal ion-containing solution. In addition, instead of introducing Ad (1) pellets into the tetramine platinum (II) chloride solution a portion of nonactivated and non-pelletized Adsorbent 1 was slurried for 3 hours at reflux temperature in sufficient solution to provide $2.8 \times 10^{-4}$ mole of tetraammine platinum (II) chloride per gram of absorbent 1 present. This procedure assures that sufficient platinum complex is adsorbed by Adsorbent 1.

At the end of the reflux period, the product is isolated by filtration. The platinum ion-exchanged product is washed with distilled water having a pH of 6.3 and dried in air at 100° C. The product filter cake is made up into ⅛ inch pellets by blending the filter cake with acid-peptized alumina, in a weight ratio of 80 parts of anhydrous product to 20 parts alumina, and extruding this blended mixture. The catalyst pellets are activated by decomposing the platinum complex in a stream of air at 600° C. for a period of 1 hour. Chemical analysis of a sample of this product indicates that 4.2% platinum, by weight, is present.

The above-prepared adsorption/combustion catalysts illustrate the nature of the metal-containing high-silica zeolites utilized in the process of the present invention. Three additional catalysts are prepared for consideration in the process of the invention, said catalysts being other than metal-containing high-silica zeolites. These catalysts, included for the purpose of comparison, are prepared as follows:

A catalyst, hereinafter designated as catalyst Cu-alumina, is prepared by slurrying α-alumina pellets for 3 hours at reflux temperature in an aqueous solution containing 1.6 moles $CuCl_2$ per liter of water. Sufficient solution is used to provide $1.6 \times 10^{-3}$ mole of $CuCl_2$ per gram of alumina present. At the end of the 3-hour period, the pellets are isolated by filtration. The copper-doped pellets are air-dried at 100° C. and then activated by passing a stream of air containing 16 mole percent $NO_2$ over the pellets for a period of 1 hour. Chemical analysis of a sample of the product indicates that 6.5% copper, by weight is present. This amount of copper is comparable to the 7.3% Cu found in the above-prepared pellets of catalyst Cu-Ad (1).

A second catalyst hereinafter designated as catalyst Pt-alumina, is prepared by slurrying α-alumina pellets for 3 hours at reflux temperature in an aqueous solution containing 0.026 mole tetraammine platinum (II) chloride per liter of water. Sufficient solution is used to provide $2.6 \times 10^{-5}$ mole of tetraammine platinum (II) chloride per gram of alumina present. At the end of the 3-hour period, the water is vacuum distilled from the pellets. The platinum-doped pellets are dried in air at 100° C., and then activated by decomposing the platinum complex in a stream of air at 600° C. for a period of 1 hour. Chemical analysis of the product shows it to contain 0.69% platinum, by weight.

A third catalyst, hereinafter designated as catalyst Cu-silica, is prepared by slurrying silica gel pellets for 3 hours at reflux temperature in an aqueous solution containing 1.6 moles $CuCl_2$ per liter of water. Sufficient solution is used to provide $1.6 \times 10^{-3}$ mole of $CuCl_2$ per gram of silica present. At the end of the 3-hour period, the pellets are isolated by filtration. The copper-doped pellets are air-dried at 100° C. and then activated by passing a stream of air containing 16 mole percent $NO_2$ over the pellets for a period of 1 hour.

EXPERIMENTAL PROCEDURE

The experimental procedure used for carrying out the illustrative and comparative examples, hereinafter discussed, is as follows:

The examples are conducted in a thermostated adsorption/combustion container comprising a vertical quartz tube (2.5 cm. I.D.; 3 cm. O.D. × 30 cm. long) having two independently heated zones wherein the temperature of the zones are controlled by respective Research Inc. Model 639B proportional process temperature and power controllers. The two zones are: (1) a preheat zone packed with quartz chips; and (2) a catalyst bed zone packed with 20 ml. of a particular catalyst in the form of 8-20 mesh pellets.

The temperature of the catalyst bed is monitored by two thermocouples placed in the lower and upper portions of the catalyst bed.

When the organic substrate is a single compound, the organic substrate is introduced in a dilute gaseous stream, prepared by saturating a carrier gas (either helium/oxygen or air) at ambient temperature (23° C.) with substrate vapor. The resulting stream then enters a gas-mixing device, wherein metered concentrations of either oxygen and nitrogen, as an internal standard, or air dilutes the feed stream to the desired concentration. Multi-component solutions are metered by a syringe pump into a heated vaporization chamber, equipped with an air purge, connected to the quartz tube inlet positioned at the lower portion of the quartz tube.

In carrying out the examples, the feed stream is fed to the quartz tube inlet where the feed stream, is heated if necessary, to the desired temperature of the preheat zone before entering the catalyst bed zone. Thermocouples in the preheat zone, in the lower and upper portions of the catalyst bed, and in the exit gas provide feedback to the power controllers. A strip-chart recorder provides continuous time/temperature profiles of the lower and upper regions of the catalyst bed. The effluent from the catalyst bed zone passes through a steel cooling coil to a gas sampling valve and then to an on-stream continuous carbon dioxide analyzer (Beckman Model 865 infrared analyzer). The carbon dioxide concentration in the effluent is recorded with respect to time.

Samples of the gaseous effluent are also analyzed by vapor phase chromatography to determine the concentration of substrate, if any, contained therein. These determinations are carried out on either a Perkin-Elmer 990 gas chromatograph equipped with a thermal conductivity detector or a Perkin-Elmer 880 equipped with a flame-ionization detector, using a stainless steel column (6 feet × ⅛ inch) packed with Tenax. The column is run isothermally at 170° C. with a 2 ml sample of effluent.

As above noted, certain of the examples discussed hereinafter are illustrated wherein the carrier gas stream into which the organic substrate was introduced is synthetic air, i.e. a mixture of helium and oxygen (80/20 by volume). The use of a He/O₂ mixture, instead of a N₂/O₂ mixture, as carrier gas of the dilute gaseous stream results in lower measured values for the ignition point and the minimum temperature of zero emission, when compared to the higher values of non-synthetic air (see Table IV). The values in Table III are believed comparable to those in Table IV when the thermal conductivities of helium and nitrogen, the primary component of air, are compared. The thermal conductivities, k, at 190° C. (the typical catalyst Cu-Ad (1) ignition point in 80% He and 20% O₂) for helium and nitrogen are as follows:

$$k_{He}^{190° C.} = 1.71 \text{ cal hr}^{-1}\text{cm}^{-1}°\text{K.}^{-1}$$

$$k_N^{190° C.} = 0.314 \text{ cal hr}^{-1}\text{cm}^{-1}°\text{K.}^{-1}$$

The approximately 100° C. reduction in the temperature of the ignition point and in the minimum temperature of zero emission reflect the lower efficacy of helium in transporting heat.

Finally, the adsorption/combustion behavior of the present invention is illustrated in FIGS. 3–6 and FIGS. 7 and 8 as follows:

In FIGS. 3–6 the adsorption/combustion process of the invention is shown by the increase and subsequent decrease in the temperature of the upper region of the catalyst bed, the temperature of the lower region of the catalyst bed, and the concentration of carbon dioxide in the effluent, all as a function of time, designated A, B and C, respectively. The decrease in the temperatures of the lower and upper regions of the catalyst bed below the temperature maintained by the auxiliary heaters is believed due to the lag time between the thermocouples which sense the decreasing temperatures within the catalyst bed and the auxiliary heaters they control. As shown in each figure the organic substrate is adsorbed during one segment of the adsorption/combustion cycle and is then combusted after sufficient organic substrate has been adsorbed by the catalyst bed. The minimum of each curve represents the point where the catalyst bed temperature is at a minimum, the generation of CO₂ is at a minimum, and organic substrate is being adsorbed by the catalyst bed. The maximum of each curve represents the point in the cycle when the catalyst bed temperature is at its maximum, the combustion of organic substrate to form essentially CO₂ and H₂O is at a maximum, and adsorption of organic substrate by the catalyst bed is at its minimum.

Figure 6:
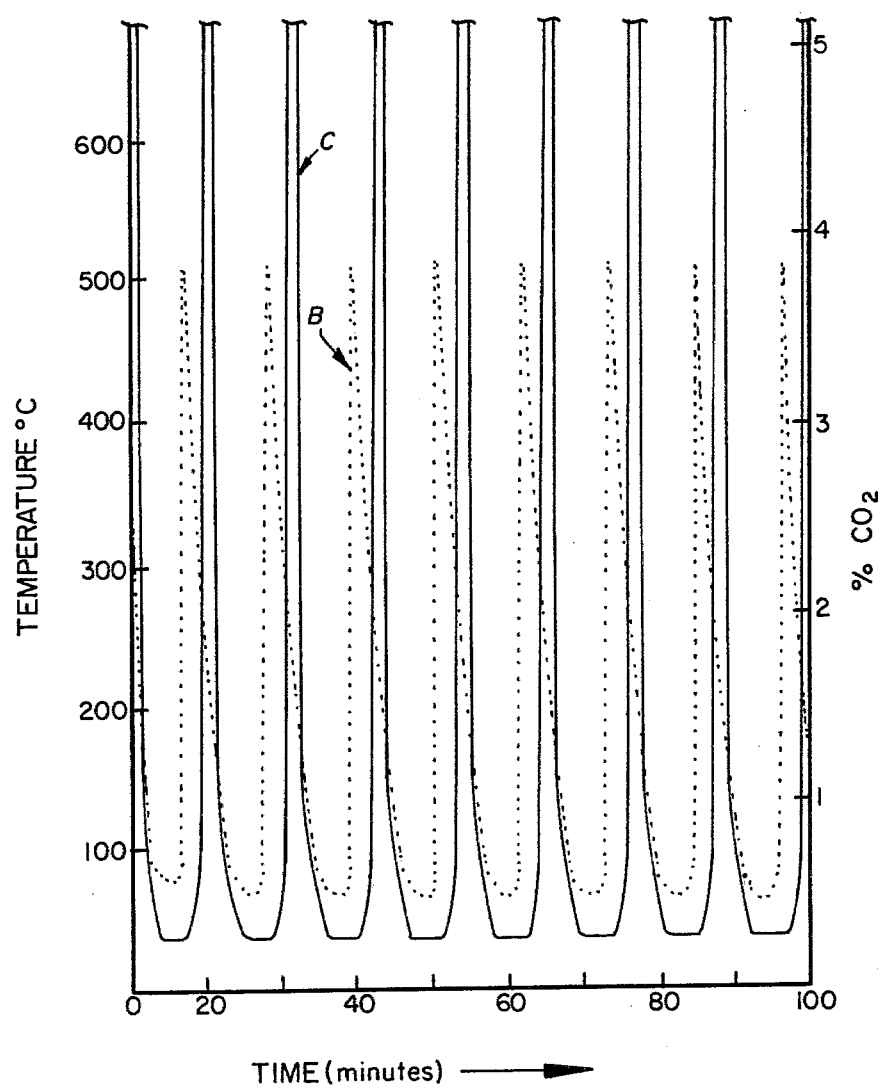
FIG. 6 illustrates the adsorption/combustion behavior of the invention as shown in FIG. 3a, except that the catalyst comprises platinum and a high-silica zeolite.
Figure 7:
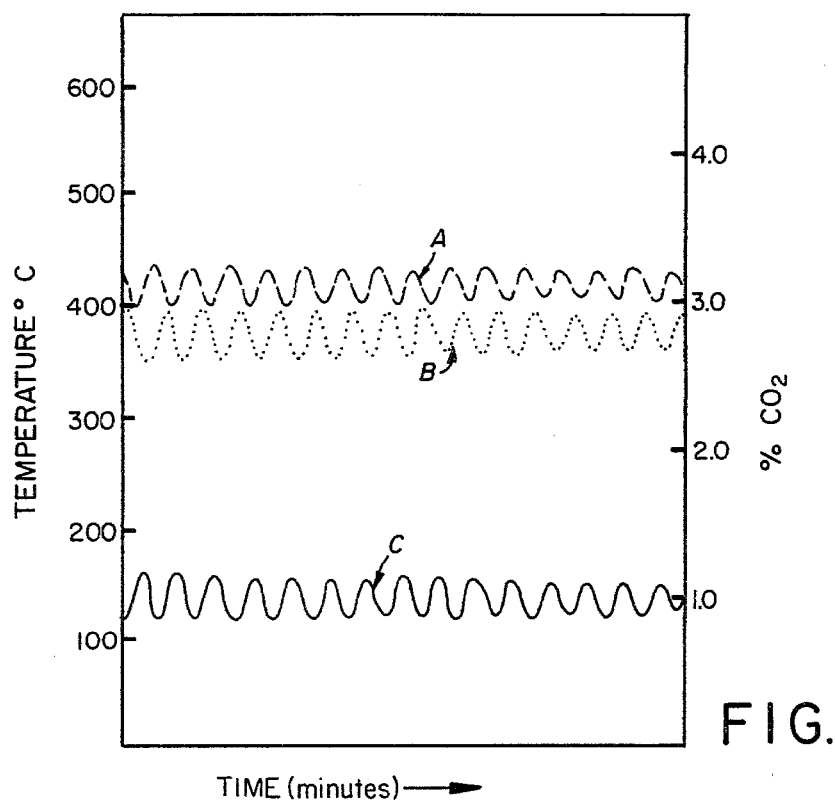
FIG. 7 illustrates the adsorption/combustion behavior for a catalyst comprising copper on alumina.
Figure 8:
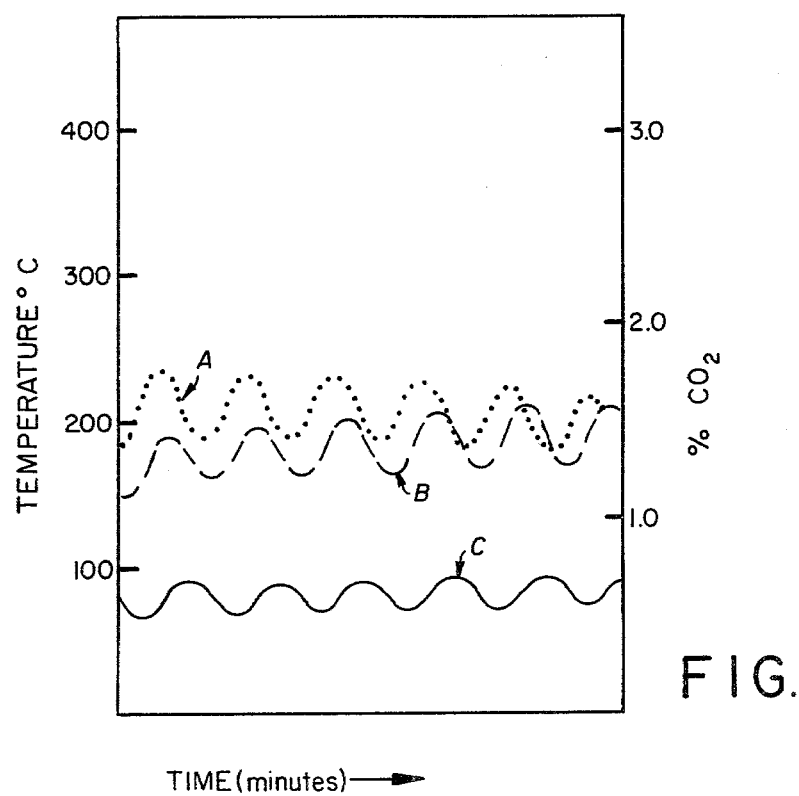
FIG. 8 illustrates the adsorption/combustion behavior of a catalyst comprising platinum on alumina.

In FIGS. 7 and 8 the processes are shown which incorporate catalysts which are not suitable for the process of the invention. The minimal adsorption/combustion of these catalysts is shown. Curves A, B and C are as defined for FIGS. 3–6.

The following examples are provided to illustrate the present invention and are in no way to be construed as limiting on the scope thereof.

EXAMPLE 1

In accordance with the present invention, catalyst Cu-Ad (1) is utilized as the catalyst bed in the gas-flow apparatus of FIG. 1 with the above-described experimental procedure. In carrying out the present invention the "temperature of ignition", "temperature of 100% combustion" and "minimum temperature of zero emission" may be determined as follows:

(a) For this determination catalyst Cu-Ad (1) is introduced into a reaction container, as shown in FIG. 1 to form the adsorption/combustion catalyst bed.

A dilute gaseous stream containing 0.25%, by volume (V/V), organic substrate in a carrier gas is introduced at the bottom of the combustion oven and is heated to the desired temperature in the quartz-chip packed preheat zone before entering the catalyst-bed zone. After combustion of the organic substrate the effluent passes to a gas sampling valve, and then to an on-stream continuous dioxide analyzer. The effluent carbon dioxide concentration is recorded with respect to time. In the instant example the dilute gaseous stream containing of 0.25% toluene and 99.75% air is preheated to 100° C. and is passed through a 20 milliliter bed of catalyst Cu-Ad (1) pellets at a space velocity of 10,000 hr$^{-1}$.

(b) The "temperature of ignition" or "ignition point" and "temperature of 100% combustion" are determined by setting the temperature of the preheat zone of the reaction container at a given temperature, allowing the apparatus to equilibrate for 30 minutes, and then taking a sample of the effluent gas and then analyzing the sample on a gas chromatograph, equipped with a flame-ionization detector, for substrate concentration. The analysis for toluene is carried out on a Perkin-Elmer 880 equipped with 6'×⅛" packed Tenax column run isothermally at 170° C. with a 0.5 ml sample. The preheat zone temperature is then incremented, and the procedure repeated until analysis shows that no toluene remains in the effluent. Such a determination is presented in Table II.

TABLE II

| Temperature | | | | |
|---|---|---|---|---|
| Preheat | Lower Catalyst Bed | Upper Catalyst Bed | Toluene Concentration[1] (raw area proportional to concentration) | Percent[2] Combustion |
| 200 | 185 | 170 | 390,834 } 390,999 = t$_o$ 391,164 | 0 |
| 220 | 210 | 190 | 387,410 } 390,253 393,096 | 0 |
| 240 | 235 | 215 | 349,945 } 360,408 370,872 | 8 |
| 260[3] | 260 | 255 | 158,496 } 165,285 172,074 | 58 |
| 280 | 310 | 310 | 34,201 } 36,544 38,888 | 91 |
| 300 | 330 | 325 | 25,812 } 25,655 25,498 | 93 |
| 320 | 355 | 345 | 8,300 } 8,454 8,607 | 98 |
| 360[4] | 380 | 370 | 1,250 } 1,312 1,374 | 100 |

[1]Raw area equals average of 2 injections on gas chromatograph with flame ionization detector

[2]% toluene combustion = $\frac{t_o\phi CH_3 \text{ conc.} - t_x\phi CH_3 \text{ conc.}}{t_o\phi CH_3 \text{ conc.}}$, wherein t$_o$ is the concentration at time O and t$_x$ is the concentration at time X.

[3]Ignition point

[4]Minimum temperature of 100% combustion (c) The "minimum temperature of zero emission", is determined by setting the preheat zone and catalyst bed at temperatures such as 100° C. and 300° C., respectively, and introducing the organic substrate, in this case toluene. With the preheat zone and catalyst bed at these temperatures the amount of organic substrate detected in the effluent is zero, as determined by gas chromatographic analysis of an effluent sample. The catalyst bed zone temperature is then decremented, the apparatus allowed to equilibrate for 30 minutes, and an effluent sample taken for analysis. This procedure is repeated until greater than 0.5% of the substrate is found in the effluent. The lower catalyst bed temperature at which 100% combustion is observed, for the given detection means, is defined as the "minimum temperature of zero emission". The "minimum temperature of zero emission" for toluene, as determined from the data presented in Table III at a preheat zone temperature of 100° C., is a temperature of 280° C. The temperature of ignition is determined to be 260° C.

TABLE III

| Temp. Setting Preheat/ Catalyst Bed | Pre-heat | Lower Catalyst Bed | Upper Catalyst Bed | Toluene Conc. $t_0 =$ 390,999 counts | % Combustion |
|---|---|---|---|---|---|
| 100/300 | 100 | 310 | 300 | 500 | 100 |
| 100/280 | 100 | 280 | 270 | 700 | 100 |
| 100/260 | 100 | 260 | 250 | 2154 | 99 |

The higher temperature observed in the lower catalyst bed, i.e. lower region of the catalyst bed, as compared to the temperature of the upper catalyst bed, is suggested as resulting from the relatively larger amount of organic substrate adsorbed at the portion of the catalyst bed that is first contacted by the organic substrate.

EXAMPLE 2

In this example the adsorption/combustion process of the present invention is carried out in a gas-flow apparatus, as shown in FIG. 1, according to the above-described experimental procedure. Catalyst Cu-Ad (1) is chosen as the adsorption/combustion catalyst and the catalyst bed comprises a 20 milliliter bed of the catalyst Cu-Ad (1) pellets. The dilute gaseous stream comprises 0.5% toluene (V/V) as the organic substrate and 99.5% air. The space velocity of the stream is 10,000 hr$^{-1}$. The temperature of the preheat zone is set at 100° C. and the auxiliary heaters supply heat to the catalyst bed so as to maintain the catalyst bed at about 240° C. The effluent is analyzed continuously and no organic substrate, i.e. toluene, is detected in the effluent.

Figure 3A:
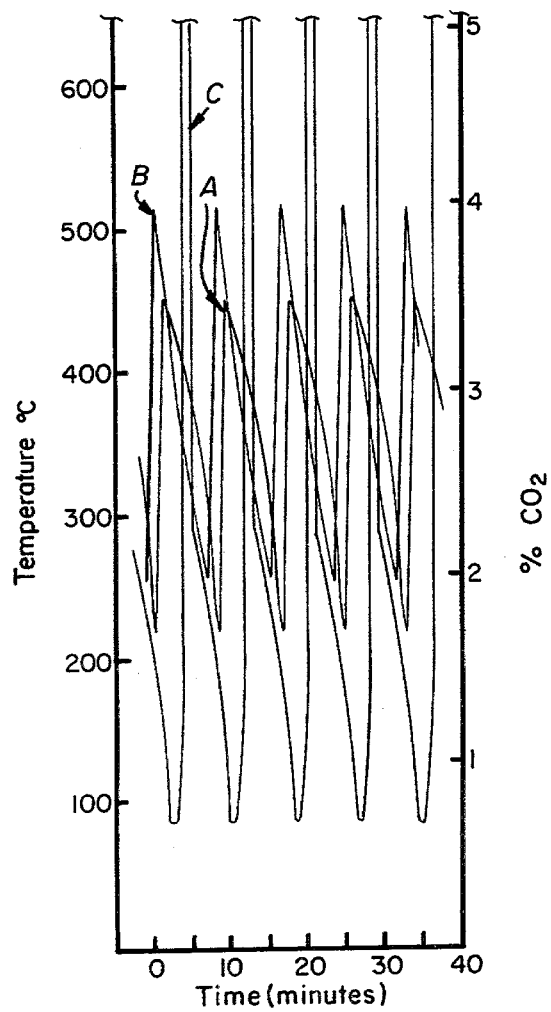
FIG. 3a illustrates the adsorption/combustion behavior of the invention for a catalyst comprising copper and a high-silica zeolite by plotting the temperatures of the lower and upper regions of the catalyst bed and the percent carbon dioxide in the effluent, all as a function of time, wherein the organic substrate is toluene and the carrier gas is air.

The adsorption/combustion behavior observed during this example, is illustrated in FIG. 3a, wherein the percent $CO_2$, as a percentage of the effluent, and the temperatures of the lower and upper regions of the catalyst bed are plotted as a function of time. FIG. 3a illustrates the adsorption/combustion behavior of the invention.

The "temperature of ignition", "minimum temperature of 100% combustion" and the "minimum temperature of zero emission" are determined as 280° C., 380° C., and 250° C., respectively.

EXAMPLE 3

The process described in Example 2 is repeated, except the carrier gas for the organic substrate is synthetic air instead of air and the auxiliary heaters supply heat to the catalyst bed so as to maintain the temperature of the catalyst bed or a portion thereof at or about the temperature of ignition for toluene, i.e. 190° C. Analysis of the effluent shows that no organic substrate is passing uncombusted into the effluent.

Figure 3B:
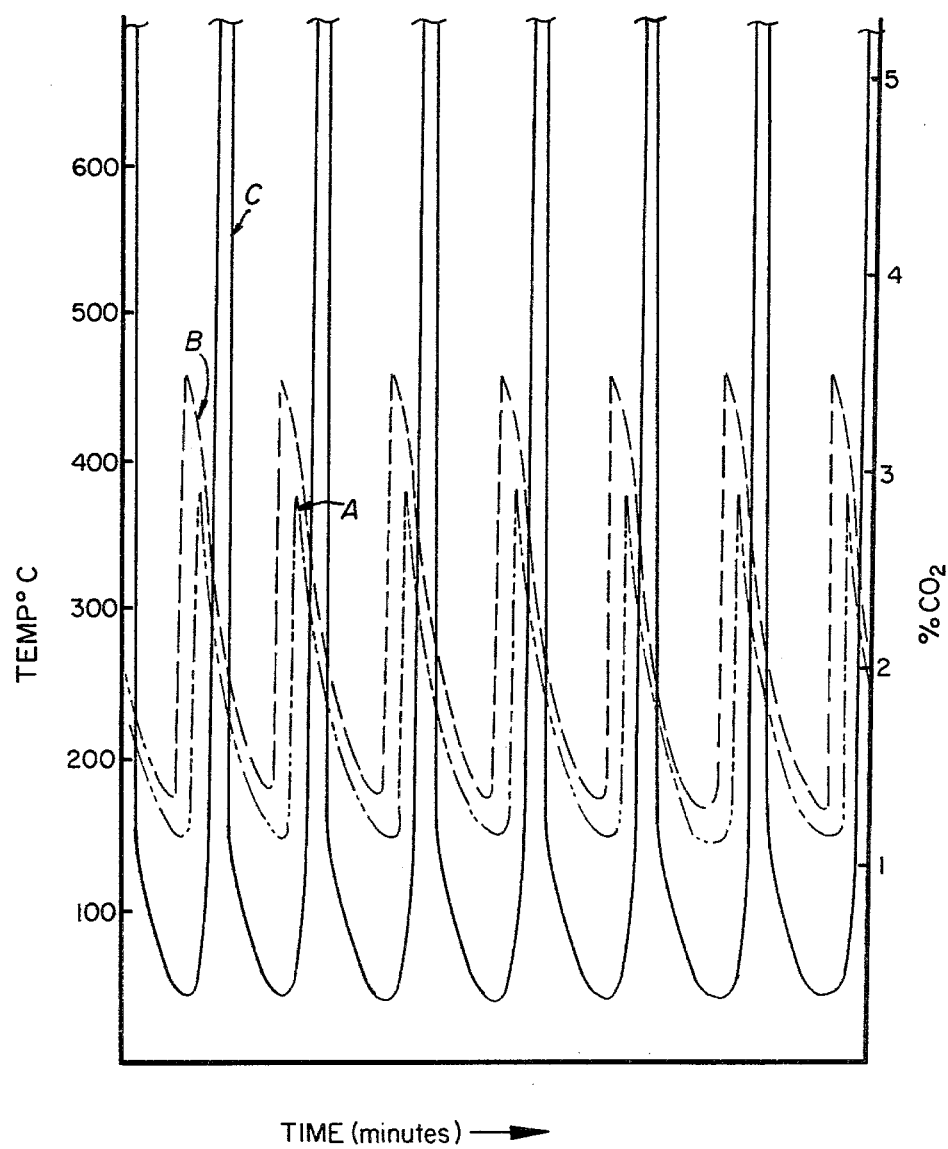
FIG. 3b illustrates the invention as in FIG. 3a except that the carrier gas is a mixture of helium and oxygen.

FIG. 3b illustrates the adsorption/combustion behavior of the process when the dilute stream comprises synthetic air as the carrier gas, as in this example. The temperature of ignition for toluene in synthetic air with catalyst Cu-Ad (1) as the adsorption/combustion catalyst is 190° C. and the minimum temperature of 100% combustion is 380° C. The minimum temperature of zero emission is 200° C. These values are included in Table IV.

EXAMPLES 4–9

The process described in Example 2 is repeated except that the organic substrate for each example is as shown in Table IV and each substrate is run in synthetic air as the carrier gas. The values of "ignition point", "minimum temperature of 100% combustion", and "minimum temperature of zero emission" are determined for each organic substrate and are as shown in Table IV. Each example exhibits the adsorption/combustion behavior of the process of the invention, as illustrated in FIG. 3b for toluene.

TABLE IV

| Example | Substrate | Ignition[a] Point (°C.) | Minimum Temperature of Zero Emission[a] (°C.) | Minimum[a,d] Temperature of 100% Combustion (°C.) |
|---|---|---|---|---|
| 3 | Toluene | 190 | 200 | 380 |
| 4 | Xylene | 190 | 240 | 370 |
| 5 | Methyl Ethyl Ketone | 190 | 200 | 330 |
| 6 | Methyl Isobutyl Ketone | 140 | 200 | 370 |
| 7 | Isopropanol | 190 | 210 | 380 |
| 8 | CELLOSOLVE Solvent[b] | 190 | 200 | 350 |
| 9 | Methyl CELLOSOLVE Acetate[c] | 190 | 200 | 320 |

[a]Determined in synthetic air, He/O$_2$ (80/20, v/v).
[b]CELLOSOLVE solvent is a trademark of Union Carbide Corporation for 2-Ethoxyethanol.
[c]Methyl CELLOSOLVE Acetate is a trademark of Union Carbide Corporation for 2-Methoxyethanol acetate.
[d]The values for the minimum temperature of 100% combustion for each example are the same as those found in Table IV of co-pending U.S. Pat. application S.N. 864,835 filed December 27, 1977.

A comparison of the values in Table IV for the minimum temperature of zero emission and the minimum temperature of 100% combustion illustrate the unique process of the present invention, wherein the temperature for combustion is lower than that required for the "Steady State" combustion process disclosed in U.S. patent application Ser. No. 864,835 filed Dec. 27, 1977. For example, example 3 illustrates that in the instant process that minimum temperature of zero emission is 200° C. whereas the minimum temperature of 100% combustion is 380° C. Examples 4–9 similarly illustrate the significant difference between the instant process and "Steady State" combustion.

EXAMPLES 10–12

The adsorption/combustion process described in example 2 is repeated except that the dilute gaseous stream comprises 0.5% organic substrate and 99.5% air.

The values of "ignition point", "minimum temperature of 100% combustion", and "minimum temperature of zero emission" for each organic substrate are as shown in Table V. Each example shows the adsorption-combustion behavior of the present invention, as illustrated in FIG. 3a for toluene.

The higher temperature values as compared to the values of Table IV are suggested to occur as a result of the differences in thermal conductivities between He and $N_2$ in the different carrier gases, as previously discussed.

TABLE V

| Ex. | Substrate | Ignition Point[a] (°C.) | Minimum[a] Temperature of Zero Emission (°C.) | Minimum[a] Temperature of 100% Combustion (°C.) |
|---|---|---|---|---|
| 10[b] | Toluene | 280 | 250 | 380 |
| 11 | Isopropanol | 220 | 220 | 300 |
| 12 | Acetone-Isopropanol (3:1) | 270 | 270 | 380 |

[a]Determined in air.
[b]The difference in the ignition point as compared to Example 1 is within experimental error for the gas-flow apparatus used for these examples and is believed to arise from slight deviations in the placement of the heaters and/or thermocouples within the catalyst bed.

EXAMPLE 13

The process of the invention, as described in Example 2, is repeated to determine the effect of changes in the concentration of the organic substrate in the dilute stream. This determination is as follows:

(a) A dilute gaseous stream comprising 0.25% toluene (V/V) in 99.75% air is combusted by the process of the invention, as described in example 2, except that the auxiliary heaters supply heat to the catalyst bed when the catalyst bed temperature is less than or equal to 280° C.

The adsorption/combustion behavior of the invention is observed with a cycle amplitude from 215° C. to 430° C., as measured in the lower region of the catalyst bed, and with a cycling amplitude from 0.30% to over 5% for the carbon dioxide concentration. The period of cycling is about 7 minutes. Analysis of the effluent indicates that toluene is combusted so that about 1 ppm (part per million) or less of toluene remains in the effluent.

Figure 4:
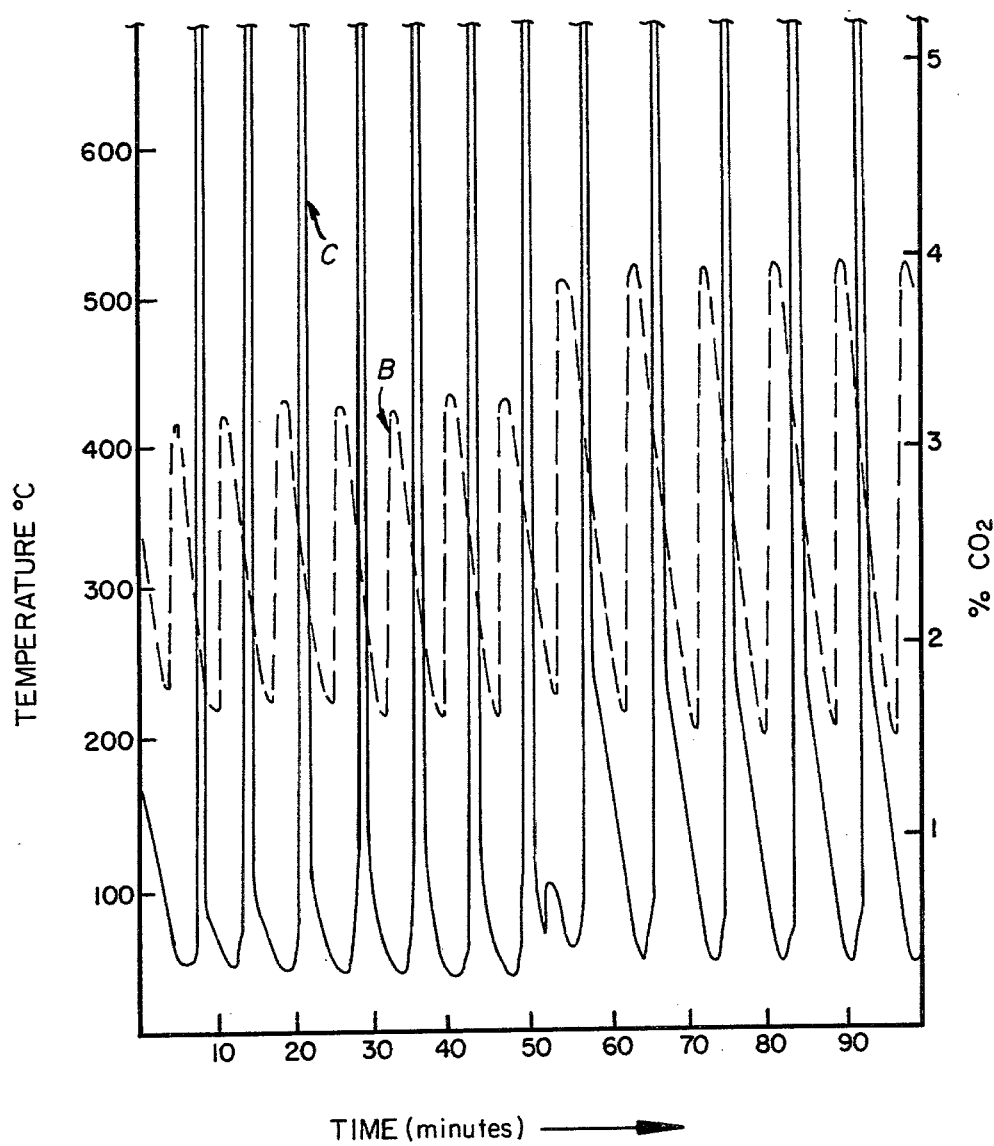
FIG. 4 illustrates the adsorption/combustion behavior of the invention as in FIG. 3b except that FIG. 4 illustrates the process for a change in concentration of the organic substrate.

(b) The dilute gaseous stream in (a) is then enriched with organic substrate so that the dilute stream contains 0.5% toluene (V/V) and 99.5% air. The process of the invention is repeated and the adsorption/combustion behavior is observed as follows: the cycle amplitude is measured as from 200° C. to 515° C., as measured in the lower region of catalyst bed; the carbon dioxide concentration is measured as from about 0.35% to over 5%, (V/V of the effluent) and the cycling period is about 10 minutes. FIG. 4 illustrates the adsorption/combustion behavior of the invention by showing the upper and lower bed temperatures and carbon dioxide concentration, all as a function of time, for both concentrations of toluene.

EXAMPLE 14

To determine the effect of changes in bed temperature on the adsorption/combustion process of the invention, Example 2 is repeated as follows:

(a) A vapor stream of 0.25% toluene and 99.75% air is preheated to 100° C. and combusted over the 20 ml. bed of catalyst Cu-Ad (1) pellets at a space velocity of 10,000 $hr^{-1}$ in an adsorption/combustion process as described in example 2. The auxiliary heaters supply heat to the catalyst bed when the catalyst bed temperature is less than or equal to 280° C. The amplitude of an adsorption/combustion cycle is measured at from about 210° C. to about 435° C., as indicated by the temperature of the lower region of the catalyst bed, and the carbon dioxide concentration is measured as from about 0.30% to over 5% (V/V of effluent). The period of an adsorption/combustion cycle is about 7 minutes.

(b) The auxiliary heaters are then set to supply heat to the catalyst bed when the catalyst bed temperature is less than or equal to 320° C. The cycling amplitude is measured at from about 250° C. to about 410° C., as indicated by the temperature of the lower region of the catalyst bed, and the carbon dioxide concentration is measured as from about 0.35% to over 5% (V/V of effluent). The period of an adsorption/combustion cycle is about 5 minutes.

(c) The auxiliary heaters are then set to supply heat to the catalyst bed when the catalyst bed temperature was less than or equal to 380° C. The amplitude of an adsorption/combustion cycle, as determined by the bed temperature, is measured as zero for a catalyst bed temperature of about 410° C. and the carbon dioxide concentration is measured in the effluent as 1.2% (V/V). No adsorption/combustion behavior is observed when the catalyst bed temperature is at this temperature.

Figure 5:
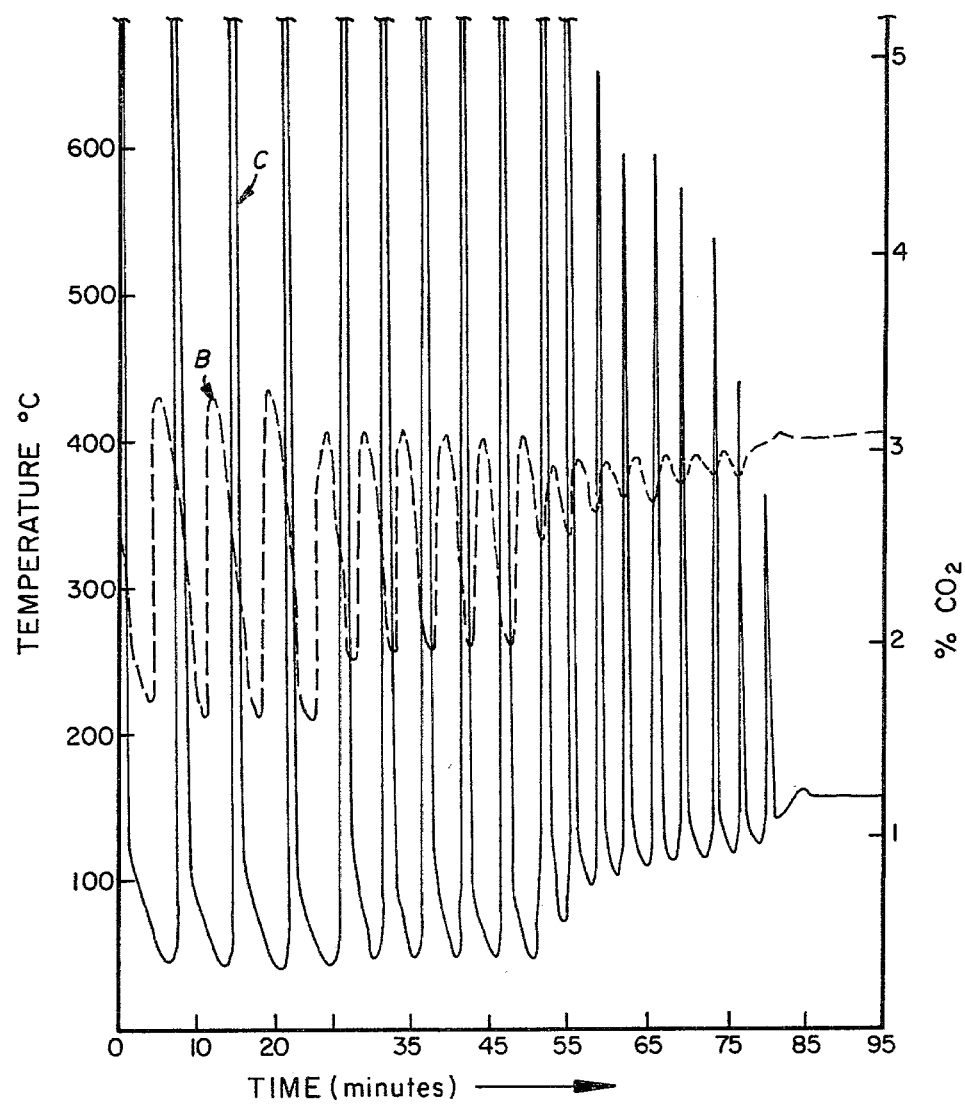
FIG. 5 illustrates the adsorption/combustion behavior of the invention as in FIG. 3b except that FIG. 5 illustrates the process for increasing catalyst bed temperatures.

(d) FIG. 5 illustrates the effect of changes in catalyst bed temperatures on the adsorption/combustion process of the invention, as shown by the catalyst bed temperature and carbon dioxide concentration changes, both as a function of the time. At the higher catalyst bed temperatures the higher input of heat into the catalyst bed results in more organic substrate combustion as the temperature of the catalyst bed approaches the minimum temperature of 100% combustion.

EXAMPLE 15

The adsorption/combustion process described in example 2 is repeated, except that the dilute gaseous stream contains 0.08% toluene in 99.92% air. At this concentration the toluene is completely combusted without prior adsorption on the adsorption/combustion catalyst and no adsorption/combustion behavior is observed. This occurs because some minimum level of combustion occurs continuously by virtue of the catalyst bed being maintained at about or below $T_i$ for the organic substrates. Thus when a very low amount of substrate is present it will be combusted without adsorption.

EXAMPLE 16

The adsorption/combustion process described in example 2 is repeated, except that the dilute gaseous stream contains 0.1% organic substrate, comprising a mixture of acetone, isopropanol and vinyl acetate (weight ratio 9:3:2), in 99.9% air. The amplitude of an adsorption/combustion cycle is measured as from about 220° C. to about 340° C., as indicated by the catalyst bed temperature, and the carbon dioxide concentration is measured as from about 0.2% to about 4.3% (V/V of effluent). The period of an adsorption/combustion cycle is about 18.5 minutes. All organic substrate is combusted.

EXAMPLE 17

The adsorption/combustion catalyst Pt-Ad (1) is used in the adsorption/combustion process of the invention, as described in example 2, by passing a dilute stream of 0.25% toluene in 99.75% air at ambient temperature (23° C.) through a 20 ml. bed of catalyst Pt-Ad (1) at a space velocity of 10,000 hr$^{-1}$. The auxiliary heaters supply heat when the temperature of the catalyst bed is less than or equal to 100° C. Adsorption/combustion behavior is observed, wherein the amplitude of an adsorption/combustion cycle is measured at from about 65° C. to 550° C. as indicated by the temperature of the lower region of the catalyst bed, or from about 80° C. to about 475° C., as indicated by the temperature of the upper region of the catalyst bed. The carbon dioxide concentration is from about 0.05 to over 5%. The period of the cycle is 11.5 minutes and the auxiliary heaters supply heat to the catalyst bed for about 5 minutes of each adsorption/combustion cycle. All substrate is combusted.

FIG. 6 illustrates the adsorption/combustion behavior of the invention for the catalyst Pt-Ad (1).

The above examples serve to illustrate the novel adsorption/combustion process of the present invention and also demonstrate the advantages of the present invention over the prior art, e.g. "Steady State" combustion. For example, the Examples set forth in Table IV show that for the combustion of the organic substrates listed therein that the minimum temperature of 100% combustion is generally from about 120° C. to about 180° C. higher than the minimum temperature of zero emission for the process of the present invention. This higher temperature required to attain "Steady-State" combustion involves a significantly greater expenditure of energy to achieve the same results, i.e. complete combustion of the organic substrate. The present invention requires a lesser amount of energy since the catalyst bed or portion thereof is heated, usually intermittently, instead of heating the gaseous stream to temperatures above $T_i$ as required for "Steady State" combustion. In addition, in the instant process the use of auxiliary fuel expenditure is generally eliminated, although an auxiliary may be used if necessary. As a result, the cost of carrying out the adsorption/combustion process will tend to be less than for the "Steady-State" process.

To more completely understand the novel process of the present invention the following comparative examples were carried out as follows:

EXAMPLE 18

A procedure similar to that described in example 2 is repeated except that a dilute stream of 0.25% (V/V) toluene, as the organic substrate, in 99.75% air is preheated to 100° C. and passed through a 20 ml bed of 6.5% copper on alumina pellets, i.e. Cu-alumina, at a space velocity of 10,000 hr$^{-1}$. The auxiliary heaters supply heat when the temperature of the catalyst bed is less than or equal to 340° C. The process is monitored by recording the temperature of the catalyst bed and the percentage of $CO_2$ in the effluent, all as a function of time. The resulting recordings are shown in FIG. 7. Although a very slight adsorption/combustion behavior is observed, the amplitude of an adsorption/combustion cycle is from about 345° C. to about 395° C., as shown in FIG. 6 and as indicated by the temperature of the upper region of the catalyst bed. The carbon dioxide concentration is measured as being from about 0.87 to about 1.12 percent of the effluent.

The toluene is completely combusted; however, the catalyst bed requires nearly constant input of heat from the auxiliary heaters. Thus, while a slight adsorption/combustion behavior is observed, it provides no advantages in decreasing the temperature of the catalyst bed or reducing the period during which auxiliary heat must be supplied to the catalyst bed.

When toluene is combusted by "Steady State" combustion the toluene is combusted when the feed stream is preheated to 340° C. Therefore, the slight adsorption/combustion behavior of Cu-alumina provides no advantage over "Steady State" combustion.

For catalyst bed temperatures less than about 340° C. the adsorption/combustion behavior shows an increase in the amplitude and period of each cycle, i.e. an increase in the maximum and minimum bed temperatures.

Although there is no toluene detected in the effluent when the catalyst bed temperature is at the maximum combustion temperature, toluene is detected in the effluent, approximately 50% of the original concentration, at the catalyst bed temperature corresponding to the minimum combustion temperature. Therefore, the catalyst Cu-alumina may exhibit slight adsorption/combustion behavior but is inefficient in abating the passage of organic substrate into the effluent as a pollutant.

EXAMPLE 19

A procedure similar to that described in example 2 is repeated except that the dilute stream comprises 0.25% (V/V) toluene in 99.75% air preheated to 100° C. and is passed through a 20 ml bed of catalyst Pt-alumina at a space velocity of 10,000 hr$^{-1}$. The auxiliary heaters supply heat to the catalyst bed when the temperature of the catalyst bed is equal to or less than about 160° C.

Slight adsorption/combustion behavior is observed. The amplitude of an adsorption/combustion cycle is measured as from about 160° C. to about 210° C., as indicated by the temperature of the lower region of the catalyst bed, or from about 180° C. to about 230° C., as indicated by the temperature of the upper region of the catalyst bed. The carbon dioxide concentration is measured as from about 0.5% to about 0.7% of the effluent (V/V). The period of an adsorption/combustion cycle is about 11.5 minutes. The above behavior is shown in FIG. 8.

At the minimum temperature of the adsorption/combustion cycle approximately 50% of the toluene remains uncombusted and is present in the effluent.

The toluene is combusted as in steady state combustion mode when the feed stream is preheated to about 180° C. Therefore, no savings are derived from using Pt-alumina in the process of the invention.

EXAMPLE 20

A procedure similar to that described in example 2 is repeated, except that the dilute stream comprising 0.25% toluene (V/V) in 99.75% air, is preheated to 80° C. and is passed through a catalyst bed comprising catalyst Cu-silica at a space velocity of 10,000 hrs$^{-1}$.

Prior to use in the above process, catalyst Cu-silica was activated by passing $NO_2$ over the catalyst at from about ambient temperature to about 250° C. and then baked out at 350° C. in air for one hour.

The auxiliary heaters supply heat to the catalyst bed when the temperature of the catalyst bed falls below a set value, said value being, between about 160° C. to about 443° C.

Catalyst Cu-silica showed no significant adsorption/combustion behavior under the above-described experimental conditions for catalyst bed temperatures between about 160° C. and about 443° C.

What is claimed is:

1. A process for the combustion of an organic substrate wherein said process comprises intimately contacting said organic substrate, at a temperature below the temperature of ignition of the organic substrate, with an organophilic catalyst bed comprised of a metal-containing zeolite having a silica to alumina ratio of at least 10, wherein the metal is at least one of platinum, palladium, copper, nickel, chromium and manganese; and combusting the organic substrate by an adiabatic temperature rise in the catalyst bed, in the presence of an oxygen-containing gas, after sufficient organic substrate has been adsorbed by the catalyst bed.

2. A process for the combustion of an organic substrate contained in a dilute stream thereof which comprises:
   (a) introducing the dilute stream at a temperature below the temperature of ignition of the organic substrate in the dilute stream into a reaction zone containing an organophilic catalyst bed comprised of a metal-containing zeolite having a silica to alumina ratio of at least 10, wherein the metal is at least one of platinum, palladium, copper, nickel, chromium and manganese;
   (b) passing said dilute stream into intimate contact with the catalyst bed of metal-containing zeolite such that the organic substrate is adsorbed by the organophilic catalyst bed;
   (c) heating the catalyst bed or portion thereof intermittently to about the temperature of ignition of the organic substrate in the dilute stream; and
   (d) combusting the adsorbed organic substrate, when sufficient organic substrate has been adsorbed by the catalyst bed, in the presence of an oxygen-containing gas, by means of an adiabatic temperature rise in the catalyst bed to form essentially carbon dioxide and water vapor.

3. The process of claim 1 or 2 wherein the metal-containing zeolite has a thermal and hydrothermal stability of at least 600° C.

4. The process of claim 1 or 2 wherein the metal is copper.

5. The process of claim 1 or 2 wherein the metal is platinum.

6. The process of claim 1 or 2 wherein the oxygen-containing gas is air.

7. The process of claim 1 or 2 wherein the metal-containing zeolite is a ZSM-5-type zeolite.

8. The process of claim 1 or 2 wherein the metal-containing zeolite is an organophilic zeolite composition having in the dehydrated state a composition in terms of mole ratios of oxides as:

$$0.01-2.0Z^{++}O:0-0.2M_{2/n}O:Al_2O_3:20-100SiO_2$$

wherein $Z^{++}$ is at least one cation from the metals platinum, palladium, copper, nickel, chromium and manganese and M is at least one cation having a valence "n", said composition having a characteristic X-ray powder diffraction pattern containing at least the d-spacings of Table I.

9. The process of claim 8 wherein M represents an alkali metal cation.

10. The process of claim 8 wherein the $SiO_2/Al_2O_3$ mole ratio is from 35 to 85.

11. The process of claim 8 wherein the $SiO_2/Al_2O_3$ mole ratio is from 35 to 55.

12. The process of claim 8 wherein the metal-containing zeolite is an organophilic zeolite composition having in the dehydrated state a composition in terms of mole ratios of oxides as:

$$1.6-2.0Cu^{++}O:0-0.2M_{2/n}O:Al_2O_3:20-100SiO_2$$

wherein M is at least one cation having a valence of "n", said composition having a characteristic X-ray powder diffraction pattern containing at least the d-spacings of Table I.

13. The process of claim 12 wherein M represents an alkali metal cation.

14. The process of claim 12 wherein the $SiO_2/Al_2O_3$ mole ratio is from 35 to 85.

15. The process of claim 14 wherein the $SiO_2/Al_2O_3$ mole ratio is from 35 to 55.

16. The process of claim 8 wherein the metal containing zeolite is an organophilic zeolite composition having in the dehydrated state a composition in terms of mole ratios of oxides as:

$$0.01-1.0Pt^{++}O:0.2M_{2/n}O:Al_2O_3:20-100SiO_2$$

wherein M is at least one cation having a valence "n", said composition having a characteristic X-ray powder diffraction pattern containing at least the d-spacings of Table I.

17. The process of claim 16 wherein "M" represents an alkali metal cation.

18. The process of claim 16 wherein the $SiO_2/Al_2O_3$ mole ratio is from 35 to 85.

19. The process of claim 18 wherein the $SiO_2/Al_2O_3$ mole ratio is from 35 to 55.

* * * * *

UNITED STATES PATENT AND TRADEMARK OFFICE
CERTIFICATE OF CORRECTION

PATENT NO. : 4,234,549

DATED : Nov. 18, 1980

INVENTOR(S) : Priscilla B. Stanley and James S. Ritscher

It is certified that error appears in the above—identified patent and that said Letters Patent are hereby corrected as shown below:

In the Abstract, in line 6, insert a comma after "copper".

Col. 4, line 65, after "organic" insert --substrate--.

Col. 5, line 7, "other" should read --others--.

Col. 6, line 58, "posseses" should read --possess--.

Col. 6, line 61, "evan" should read --even--.

Col. 9, line 35, "AD(1)" should read --Ad(1)--.

Col. 14, lines 37, 39 & 41, 48, 52 & 66, "n-hexane" should read --$\underline{n}$-hexane--.

Col. 15, line 13, "equivalent" should read --quotient--.

Col. 15, line 21, "illustrate" should read --illustrates--.

Col. 16, line 22, "54.4" should read --54.5--.

UNITED STATES PATENT AND TRADEMARK OFFICE
CERTIFICATE OF CORRECTION

PATENT NO. : 4,234,549

DATED : Nov. 18, 1980

INVENTOR(S) : Priscilla B. Stanley and James S. Ritscher

It is certified that error appears in the above-identified patent and that said Letters Patent are hereby corrected as shown below:

Col. 19, line 22, "$^{-\circ}K.^{-1}$" should read --$^{-1\circ}K.^{-1}$--.

Signed and Sealed this

Third Day of November 1981

[SEAL]

Attest:

GERALD J. MOSSINGHOFF

Attesting Officer — Commissioner of Patents and Trademarks